US008834004B2

(12) United States Patent  
Thompson et al.

(10) Patent No.: US 8,834,004 B2  
(45) Date of Patent: Sep. 16, 2014

(54) LIGHTING DEVICES WITH PATTERNED PRINTING OF DIFFRACTIVE EXTRACTION FEATURES

(75) Inventors: David S. Thompson, West Lakeland, MN (US); Zhaohui Yang, North Oaks, MN (US); Matthew S. Stay, Saint Paul, MN (US); Vivian W. Jones, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 246 days.

(21) Appl. No.: 13/572,813

(22) Filed: Aug. 13, 2012

(65) Prior Publication Data

US 2014/0043850 A1 Feb. 13, 2014

(51) Int. Cl.  
*F21V 8/00* (2006.01)

(52) U.S. Cl.  
CPC .............. *G02B 6/0036* (2013.01); *G02B 6/005* (2013.01)  
USPC ............ 362/618; 362/617; 362/619; 362/627

(58) Field of Classification Search  
USPC .................. 362/617, 618, 619, 620, 624, 627  
See application file for complete search history.

(56) References Cited

U.S. PATENT DOCUMENTS

| | | | |
|---|---|---|---|
| 4,082,415 A | 4/1978 | Brooks | |
| 4,550,973 A | 11/1985 | Hufnagel | |
| 5,310,222 A | 5/1994 | Chatwin | |
| 5,537,245 A | 7/1996 | Migozzi | |
| 5,543,228 A | 8/1996 | Taniguchi | |
| 5,703,667 A | 12/1997 | Ochiai | |
| 6,759,965 B1 | 7/2004 | Hatjasalo | |
| 6,773,126 B1 | 8/2004 | Hatjasalo | |
| 7,277,609 B2 | 10/2007 | Cassarly | |
| 8,279,369 B2 * | 10/2012 | Hwang et al. | .................... 349/62 |
| 2004/0130879 A1 | 7/2004 | Choi | |
| 2004/0156182 A1 | 8/2004 | Hatjasalo | |
| 2005/0111814 A9 | 5/2005 | Chen | |

(Continued)

FOREIGN PATENT DOCUMENTS

| | | |
|---|---|---|
| DE | 20 2008 001 960 U1 | 5/2008 |
| EP | 1351074 | 10/2003 |

(Continued)

OTHER PUBLICATIONS

PCT International Search Report for PCT/US2013/053695, mailed Nov. 27, 2013.

(Continued)

*Primary Examiner* — Laura Tso

(57) ABSTRACT

Extended area lighting devices include a light guide and diffractive surface features on a major surface of the light guide, at least some diffractive surface features adapted to couple guided-mode light out of the light guide. The diffractive features include first and second diffractive features disposed on respective first and second portions of the major surface. A patterned light transmissive layer, including a second light transmissive medium, optically contacts the second diffractive features but not the first diffractive features. A first light transmissive medium optically contacts the first but not the second diffractive features. The first and second portions may define indicia, and the first and second diffractive features provide low distortion for viewing objects through the light guide such that the indicia is not readily apparent to users when guided-mode light does not propagate within the light guide. Optical films having such diffractive features are also disclosed.

26 Claims, 16 Drawing Sheets

(56) References Cited

U.S. PATENT DOCUMENTS

| | | |
|---|---|---|
| 2005/0213348 A1 | 9/2005 | Parikka |
| 2006/0279296 A1 | 12/2006 | Lee |
| 2007/0076417 A1 | 4/2007 | Yang |
| 2008/0037127 A1 | 2/2008 | Weber |
| 2008/0184636 A1 | 8/2008 | Fisher |
| 2009/0127849 A1 | 5/2009 | Kim |
| 2009/0181484 A1 | 7/2009 | Lee |
| 2010/0027294 A1* | 2/2010 | Lee et al. ............... 362/620 |
| 2010/0079841 A1 | 4/2010 | Levola |
| 2010/0122329 A1 | 5/2010 | Jakobsson |
| 2010/0165660 A1 | 7/2010 | Weber |
| 2010/0208349 A1 | 8/2010 | Beer |
| 2010/0238686 A1 | 9/2010 | Weber |
| 2011/0088161 A1 | 4/2011 | Stimpson |
| 2011/0127637 A1 | 6/2011 | Chakravarti |
| 2011/0141395 A1 | 6/2011 | Yashiro |
| 2011/0222295 A1 | 9/2011 | Weber |
| 2011/0242837 A1 | 10/2011 | Cornelissen |
| 2011/0274399 A1 | 11/2011 | Ben Bakir |
| 2011/0279997 A1 | 11/2011 | Weber |
| 2012/0057235 A1 | 3/2012 | Chang |
| 2012/0098421 A1 | 4/2012 | Thompson |
| 2012/0099323 A1 | 4/2012 | Thompson |
| 2013/0039094 A1 | 2/2013 | Kolb |

FOREIGN PATENT DOCUMENTS

| | | |
|---|---|---|
| GB | 2340280 | 2/2000 |
| JP | 3045499 | 5/2000 |
| KR | 2009/0009443 | 9/2009 |
| WO | WO 2004/006214 | 1/2004 |
| WO | WO 2008/053078 | 5/2008 |
| WO | WO 2008/081071 | 7/2008 |
| WO | WO 2008/144644 | 11/2008 |
| WO | WO 2008/144656 | 11/2008 |
| WO | WO 2010/004187 | 1/2010 |
| WO | WO 2010/119426 | 10/2010 |
| WO | WO 2010/120422 | 10/2010 |
| WO | WO 2010/120468 | 10/2010 |
| WO | WO 2010/120864 | 10/2010 |
| WO | WO 2010/122329 | 10/2010 |
| WO | WO 2011/088161 | 7/2011 |
| WO | WO 2012/054320 | 4/2012 |
| WO | WO 2012/075352 | 6/2012 |
| WO | WO 2012/075384 | 6/2012 |
| WO | WO 2012/098421 | 7/2012 |
| WO | WO 2012/099323 | 7/2012 |
| WO | WO 2012/116129 | 8/2012 |
| WO | WO 2012/116199 | 8/2012 |
| WO | WO 2012/116215 | 8/2012 |
| WO | WO 2012/158414 | 11/2012 |

OTHER PUBLICATIONS

U.S. Appl. No. 13/572,806, Yang, filed Aug. 13, 2012, for Diffractive Lighting Devices With 3-Dimensional Appearance.

U.S. Appl. No. 13/572,823, Yang, filed Aug. 13, 2012, for Colorful Diffractive Luminaires Providing White Light Illumination.

U.S. Appl. No. 13/572,835, Thompson, filed Aug. 13, 2012, for Diffractive Luminaires.

* cited by examiner

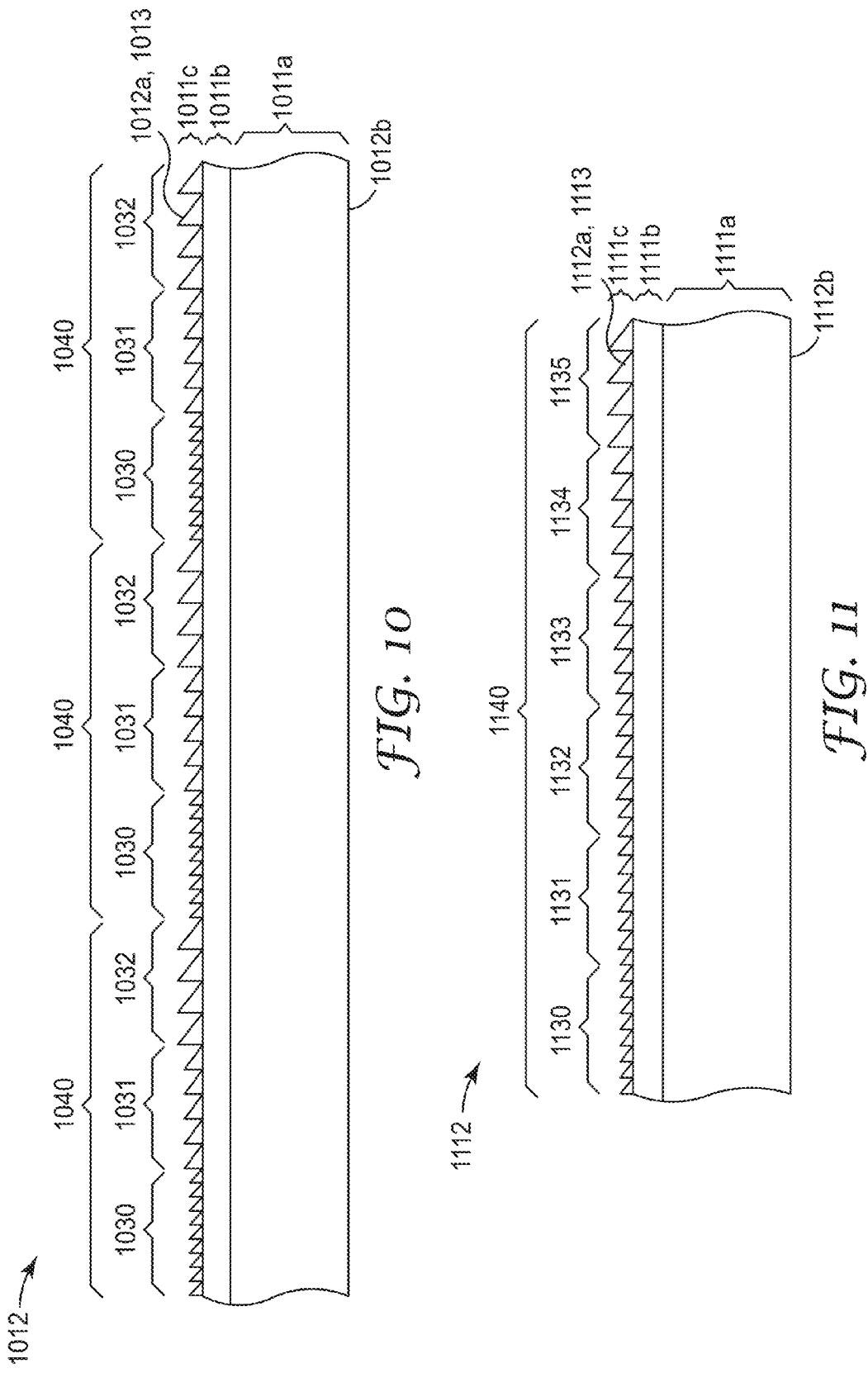

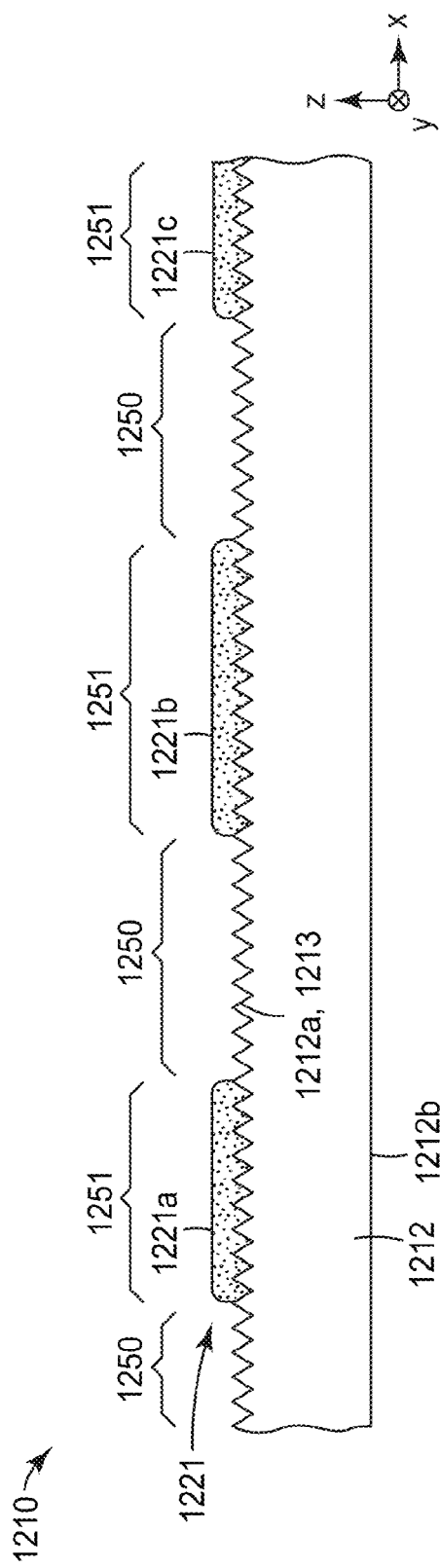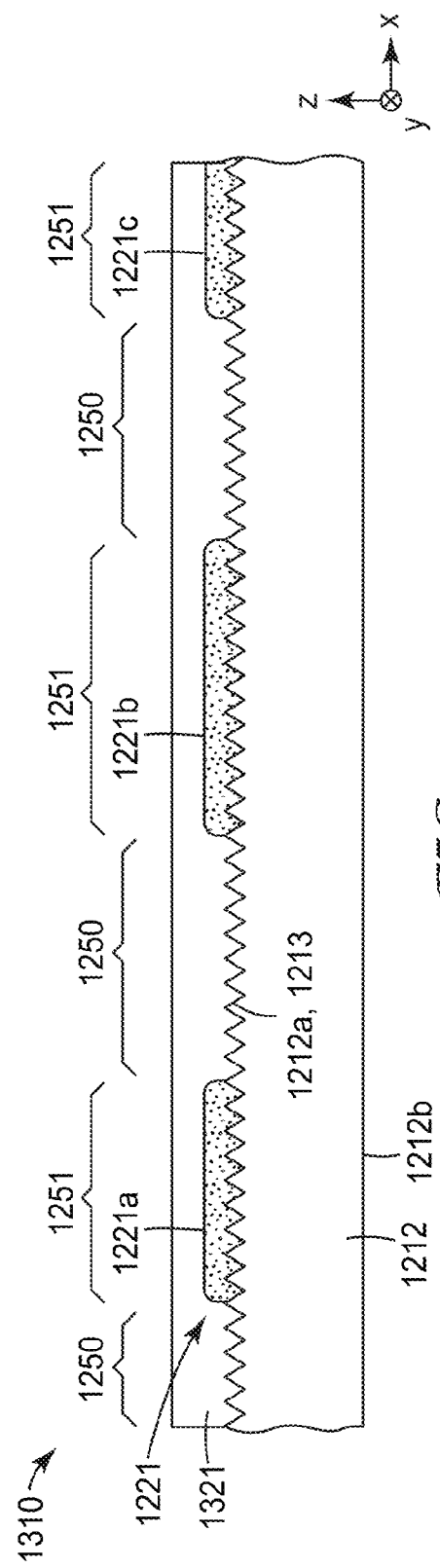

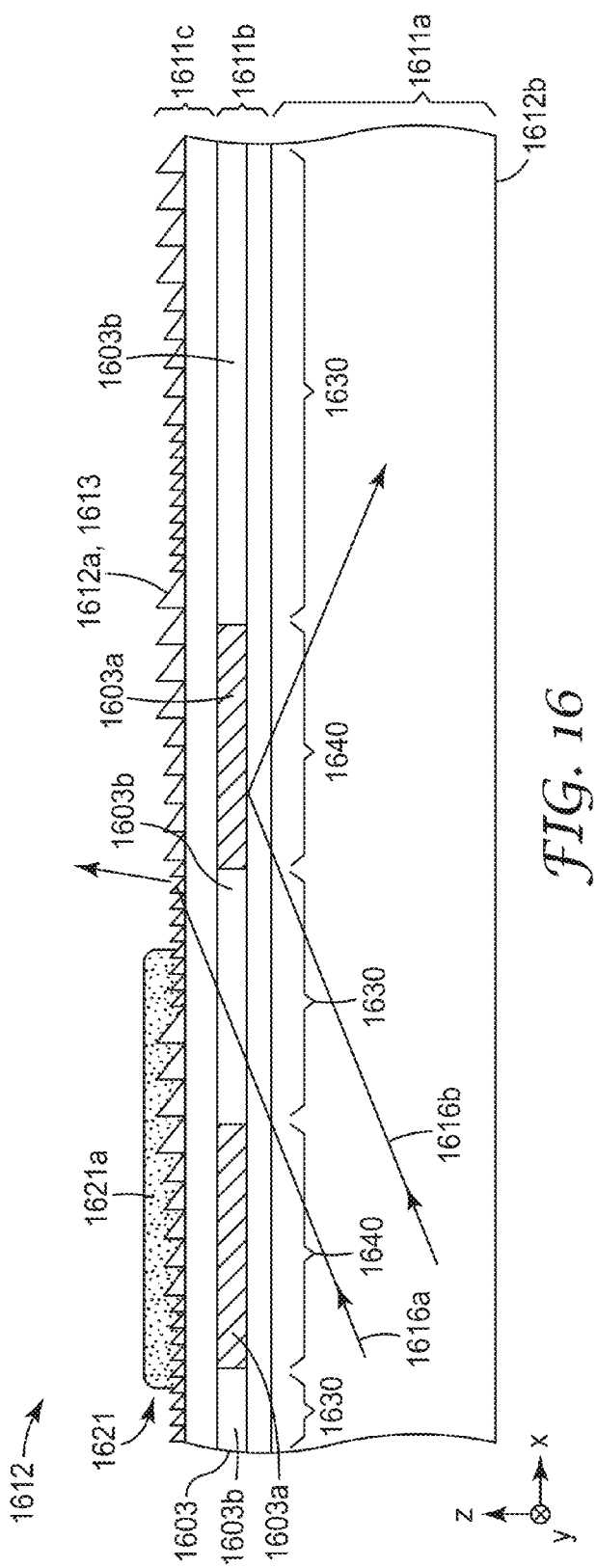
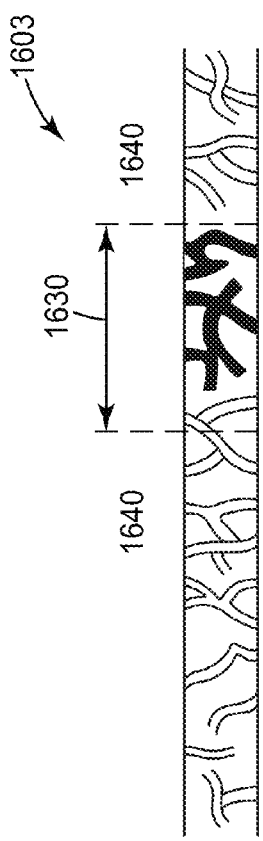
FIG. 16
FIG. 16a

LIGHTING DEVICES WITH PATTERNED PRINTING OF DIFFRACTIVE EXTRACTION FEATURES

FIELD OF THE INVENTION

This invention relates generally to lighting devices, with particular application to lighting devices that incorporate a light guide and diffractive elements to couple guided-mode light out of the light guide. The invention also relates to associated articles, systems, and methods.

BACKGROUND

Extended area lighting devices that use a light guide to spread light from discrete edge-mounted CCFL or LED light sources over the extended area of the light guide are known. Edge-lit backlights used in liquid crystal displays (LCDs) are a major example of such lighting devices. Ordinarily, it is important for such lighting devices to have a color and brightness that are uniform, or at least slowly varying, as a function of position on the extended area output surface. It is also ordinarily important for such lighting devices to emit light of a substantially white color, so that the filtering action of the liquid crystal panel can produce full color pixels and pictures ranging from blue through red.

In order to extract guided-mode light out of the light guide, edge-lit backlights often configure a major surface of the light guide to have a printed pattern of diffusive paint or other scattering material, or to have a structured surface e.g. as provided by a series of grooves or prisms whose facets are designed to change the direction of light by refraction or reflection. It is not common to extract guided-mode light out of the light guide using diffractive grooves or prisms on the major surface, because diffraction has a strong wavelength dependence which could easily produce a highly colored appearance, and a highly colored appearance is unacceptable in most end-use applications.

BRIEF SUMMARY

We have developed a new family of extended area lighting devices that extract light from an extended light guide using diffractive surface features on a major surface of the light guide. Light from one or more light sources is injected into the light guide, and at least some of the diffractive surface features interact with the injected light to couple guided-mode light out of the light guide. The diffractive surface features include first and second diffractive surface features disposed on respective first and second portions of the major surface. A patterned light transmissive layer, including a second light transmissive medium, optically contacts the second diffractive features but not the first diffractive features. A first light transmissive medium optically contacts the first but not the second diffractive features. The first and second portions may define indicia which may be decorative, utilitarian, or both. The first and second diffractive surface features provide low distortion for non-guided mode light that propagates through the light guide, to permit viewing of objects through the light guide. The low distortion can be used to ensure that the indicia is not readily apparent to users when guided-mode light does not propagate within the light guide. However, when the light sources are turned on or energized to provide the guided-mode light, the indicia can become readily apparent to users of the lighting device. The lighting device may thus provide logos or other indicia that are transparent or concealed when the lighting device is in an "off" state, but that become bright, illuminated, and revealed when the lighting device is in an "on" state. The lighting devices can be used as luminaires for general lighting or decorative lighting.

We have also developed optical films adapted for attachment to substrates to form light guides as summarized above. The optical films include a first major surface having the diffractive surface features summarized above, and a second major surface for attachment to a substrate such as a clear plate.

We describe herein, inter alia, lighting devices that include a light guide and a patterned light transmissive layer. The light guide has a first major surface. First and second diffractive surface features are formed in respective first and second portions of the first major surface, and at least one of the first and second diffractive surface features are adapted to couple guided-mode light out of the light guide. The patterned light transmissive layer, which includes a second light transmissive medium, is in optical contact with the second diffractive surface features but not the first diffractive surface features. The lighting device also includes a first light transmissive medium in optical contact with the first diffractive surface features but not the second diffractive surface features. The first and second light transmissive media may have different first and second refractive indices respectively at a visible wavelength.

The first and second refractive indices may differ by at least 0.05, or by at least 0.1. The first and second portions of the first major surface may define indicia. The first and second refractive indices may be sufficiently different so that differences in out-coupled light between the first and second portions cause the indicia to be readily apparent to a user of the lighting device when guided-mode light propagates within the light guide. The light guide may exhibit low distortion for viewing objects through the light guide in both the first and second portions. The indicia may not be readily apparent to a user of the lighting device when guided-mode light does not propagate within the light guide.

The device may also include one or more light sources disposed proximate the light guide to provide the guided-mode light in the light guide. The first light transmissive medium may be air. The second light transmissive medium may be or comprise an adhesive. The first and second light transmissive media may both be polymer compositions. The first and second light transmissive media may both be substantially transparent and colorless.

The first and second diffractive surface features may have a diffractive surface feature refractive index, the diffractive surface feature refractive index differing from the first refractive index by a first difference dn1 and differing from the second refractive index by a second difference dn2, the magnitude of dn2 being substantially less than that of dn1 such that the second diffractive surface features couple little or no guided-mode light out of light guide relative to the first diffractive surface features. In some cases, dn2 may have a magnitude less than half that of dn1 at a visible wavelength of light. Alternatively, dn1 and dn2 may have magnitudes comparable to each other such that substantial guided-mode light is coupled out of the light guide by both the first and second diffractive surface features.

The lighting devices may also include a patterned low index subsurface layer configured to selectively block some guided mode light from reaching the diffractive surface features. The patterned low index subsurface layer may in some cases include first and second layer portions, the first layer portion comprising nanovoided polymeric material, and the second layer portion comprising the nanovoided polymeric material and an additional material.

We also disclose optical films adapted for attachment to a substrate to form a light guide, such optical films including a first major surface having first and second diffractive surface features formed in first and second portions respectively of the first major surface. At least one of the first and second diffractive surface features are adapted to couple guided-mode light out of the light guide. The optical film also includes a patterned light transmissive layer in optical contact with the second diffractive surface features but not the first diffractive surface features, the patterned layer comprising a second light transmissive medium. The optical film also includes a first light transmissive medium in optical contact with the first diffractive surface features but not the second diffractive surface features, and the first and second light transmissive media have different first and second refractive indices respectively at a visible wavelength.

The optical film may exhibit low distortion for viewing objects through the optical film in both the first and second portions. The first and second portions of the first major surface may define indicia. The indicia may not be readily apparent to a user of the film before the film is attached to the substrate.

The film may further include a second major surface opposite the first major surface, and a light transmissive adhesive layer disposed at the second major surface to facilitate attachment of the film to a substrate. The film may also include a flexible carrier film and a prism layer cast on the carrier film, and the first major surface of the optical film may be an outer surface of the prism layer.

The disclosed lighting devices may also be adapted for use as security articles, e.g., articles intended for application to a product, package, or document as an indicator of authenticity, because the visual features are difficult to copy or counterfeit. Such articles thus preferably include a light guide and a patterned light transmissive layer. The light guide has a first major surface. First and second diffractive surface features are formed in respective first and second portions of the first major surface, and at least one of the first and second diffractive surface features are adapted to couple guided-mode light out of the light guide. The patterned light transmissive layer, which includes a second light transmissive medium, is in optical contact with the second diffractive surface features but not the first diffractive surface features. The lighting device also includes a first light transmissive medium in optical contact with the first diffractive surface features but not the second diffractive surface features. The first and second light transmissive media may have different first and second refractive indices respectively at a visible wavelength. The light guide may exhibit low distortion for viewing objects through the light guide in both the first and second portions.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIGS. 10 and 11 are schematic side or sectional views of light guides with diffractive surface features, the diffractive surface features including groups of surface features of different pitches;

FIGS. 12-14 are schematic side or sectional views of lighting devices in which patterned printing is used to optically contact portions of the major surface of a light guide with a patterned light transmissive layer;

FIGS. 16 and 17 are schematic side or sectional views of additional light guides with patterned printing, these light guides also having a patterned low index subsurface layer;

FIG. 16a is a schematic cross sectional view of an exemplary patterned low index subsurface layer;

FIG. 18b is a photograph of the lighting device of FIG. 18a from about the same viewing angle, but with ambient light off and the discrete light sources of the lighting device turned on;

FIG. 19 is a photograph of another lighting device having patterned printing in the shape of a United States map in contact with diffractive surface features, the lighting device photographed approximately along an optical axis of the device and with ambient light off and the discrete light sources of the lighting device turned on;

In the figures, like reference numerals designate like elements.

DETAILED DESCRIPTION OF ILLUSTRATIVE EMBODIMENTS

We have found that lighting devices such as luminaires can be made using extended area light guides, diffractive surface features, and one or more light sources, to provide general purpose illumination in a device that can also be aesthetically pleasing or otherwise have additional functionality as a result of guided-mode light extraction by the diffractive surface features that is spatially non-uniform, i.e., patterned, for a unique and interesting visual appearance. The patterning can be accomplished by applying, whether by selective printing or by other suitable techniques, a light transmissive medium (which we may refer to as a second light transmissive medium) to make optical contact with some diffractive surface features (which we may refer to as second diffractive surface features) but not other diffractive surface features (which we may refer to as first diffractive surface features) on a major surface of the light guide. The first diffractive surface features may instead be in optical contact with a different light transmissive medium (which we may refer to as a first light transmissive medium), whose refractive index at a visible wavelength is different from that of the second light transmissive medium. Depending on design details of the lighting device including the first and second light transmissive media, the patterning, and any indicia associated with the patterning, may be substantially concealed or transparent when the lighting device is in an "off" state, but bright, illuminated, and revealed when the lighting device is in an "on" state with guided-mode light provided by the light source(s).

The lighting devices may also include other visual features such as one or more bands or groups of bands having a 3-dimensional appearance, e.g. the bands may change shape as a function of viewing geometry (viewing position and/or viewing angle), and/or multiple bands may form a pattern having a 3-dimensional appearance for at least some viewing geometries. The change in shape is often associated with a change in curvature of one or more of the bands, e.g., changing from straight to curved or vice versa, or from gently curved to more strongly curved or vice versa.

Figure 1:
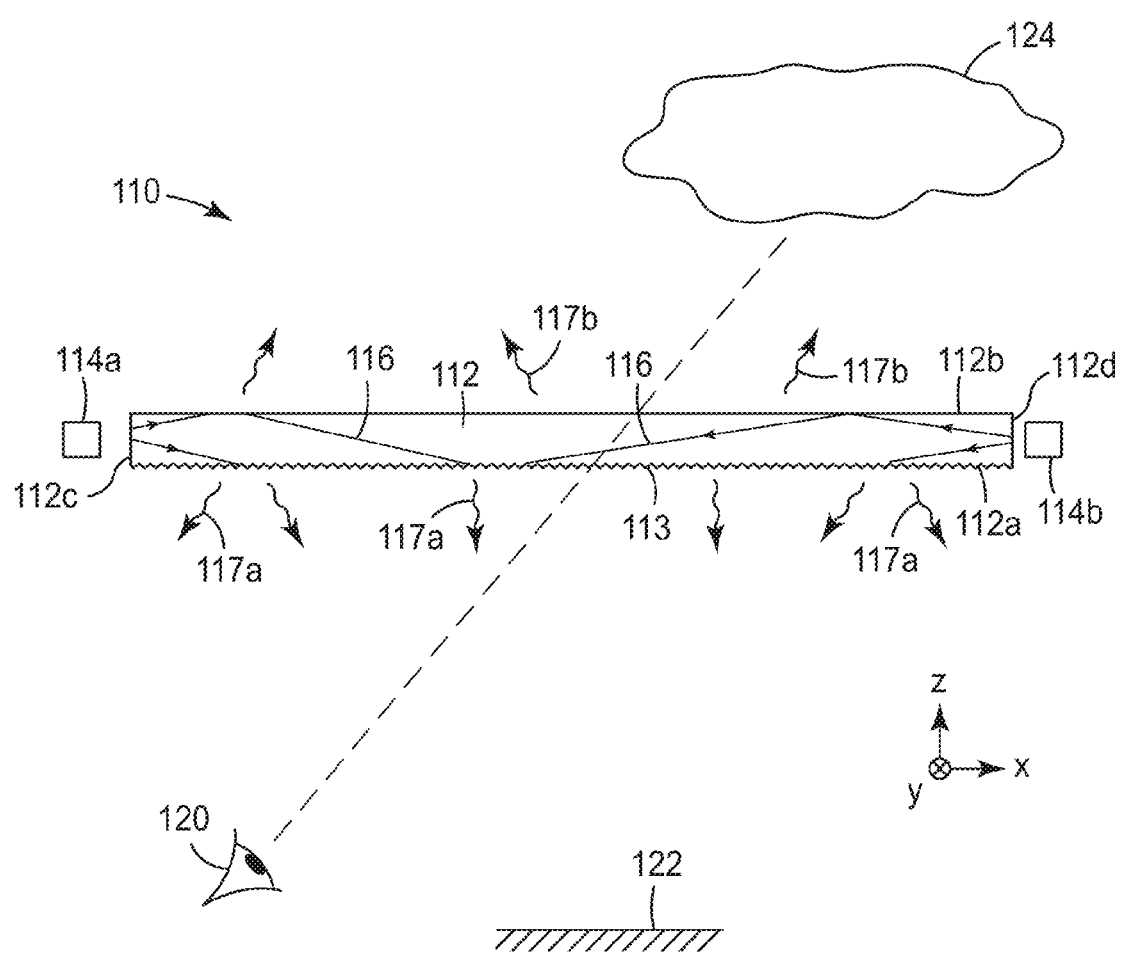
FIG. 1 is a schematic side or sectional view of a lighting device utilizing diffractive surface features on a major surface of a light guide.

An exemplary lighting device 110 is shown in schematic side or sectional view in FIG. 1. The lighting device 110 includes an extended area light guide 112 and discrete light sources 114*a*, 114*b*. The lighting device 110 may be mounted in any desired configuration but in this case it is shown mounted physically above the user 120, e.g. in or near a ceiling of a room or building. The device 110 may provide substantially white light illumination on a surface 122 such as a tabletop or floor. However, when the user 120 looks directly at the device 110, the user may see a pattern of colors across the emitting area of the device 110. The user also desirably sees indicia or other spatial patterns in the emitting area of the device resulting from the patterned printing discussed elsewhere herein. The patterned printing provides a second light transmissive medium in optical contact with some diffractive surface features on at least one major surface of the light guide. Other diffractive surface features on the same major surface are in optical contact with a different first light transmissive medium.

When looking directly at the device 110, the user may also see one or more bands having a 3-dimensional appearance in the emitting area of the device. A given band is the result of the interaction of light emitted from one of the discrete light sources and diffractive surface features on one or both major surfaces of the light guide. Alternatively, a given band may be the result of the interaction of light reflected or absorbed by a localized region of high or low reflectivity in a non-uniform reflective structure extending along a side surface of the light guide. Details of such bands are described in commonly assigned U.S. patent application Ser. No. 13/572,805, "Diffractive Lighting Devices With 3-Dimensional Appearance", filed on even date herewith.

In addition to the pattern of colors, the indicia, and the bands in the emitting area of the device, the user 120 may also observe objects such as object 124 through the light guide 112 with little or no optical distortion. Light emitted by or reflected by such objects is able to propagate through the light guide as non-guided-mode light, only a small amount of which is deflected by the diffractive surface features.

The light guide 112 is extended along two in-plane directions, shown in FIG. 1 as an x- and y-axis of a Cartesian coordinate system, so that the light guide has opposed major surfaces 112*a*, 112*b*, as well as side surfaces 112*c*, 112*d*. Diffractive surface features 113 are provided on at least one of the major surfaces of the light guide 112, such as surface 112*a* as shown in the figure, or in other embodiments surface 112*b*, or both surfaces 112*a* and 112*b*. In any case, the diffractive surface features are tailored to couple guided-mode light out of the light guide by diffraction. The guided-mode light is shown in the figure as light 116, and out-coupled light emitted from the light guide is shown as light 117*a*, 117*b*. Light 117*a* passes through the surface 112*a* in the general direction of the user 120 or surface 122, and light 117*b* passes through the surface 112*b* in the general direction away from the user 120 or surface 122. In some cases the lighting device 110 may be mounted so that the light 117*b* provides indirect illumination to the room, e.g. by redirecting the light 117*b* back into the room by reflection from the ceiling or from another reflective member.

In this regard, a reflective film or layer may be applied to all or a portion of the surface 112*b*, or it may be positioned near the surface 112*b*, so as to redirect the light 117*b* so it emerges from the surface 112*a*. The reflective film may reflect light diffusely, specularly, or semi-specularly, and may reflect light uniformly or non-uniformly as a function of wavelength, and it may reflect normally incident light uniformly or non-uniformly as a function of polarization. The reflective film may for example be or comprise: white paint or paints of any other color; high reflectivity mirror films, e.g., films with metal coatings such as aluminum, silver, nickel, or the like, or non-metallic mirror films such as 3M™ Vikuiti™ ESR; multilayer optical films having organic (e.g. polymeric) or inorganic constituent optical layers with a layer thickness profile tailored to reflect light over some or all of the visible spectrum at normal incidence or at another desired incidence angle; ESR films with diffuse coatings; white reflectors having glossy surfaces; reflectors with brushed metal surfaces, including films with metal coatings whose surface is roughened to provide semi-specular or diffuse reflectivity; reflectors with structured surfaces; microcavitated PET films; 3M™ Light Enhancement Films; and/or reflective polarizing films, including but not limited to Vikuiti™ Diffuse Reflective Polarizer Film (DRPF), Vikuiti™ Dual Brightness Enhancement Film (DBEF), Vikuiti™ Dual Brightness Enhancement Film II (DBEF II), and multilayer optical films having different reflectivities for normally incident light of different polarizations but an average reflectivity of greater than 50% for such normally incident light, over some or all of the visible spectrum. See also the optical films disclosed in:

US 2008/0037127 (Weber), "Wide Angle Mirror System"; US 2010/0165660 (Weber et al.), "Backlight and Display System Using Same"; US 2010/0238686 (Weber et al.), "Recycling Backlights With Semi-Specular Components"; US 2011/0222295 (Weber et al.), "Multilayer Optical Film with Output Confinement in Both Polar and Azimuthal Directions and Related Constructions"; US 2011/0279997 (Weber et al.), "Reflective Film Combinations with Output Confinement in Both Polar and Azimuthal Directions and Related Constructions"; WO 2008/144644 (Weber et al.), "Semi-Specular Components in Hollow Cavity Light Recycling Backlights"; and WO 2008/144656 (Weber et al.), "Light Recycling Hollow Cavity Type Display Backlight".

The light guide 112 may be physically thick or thin, but it is preferably thick enough to support a large number of guided modes and furthermore thick enough to efficiently couple to the emitting area of the discrete light sources. The light guide may, for example, have a physical thickness in a range from 0.2 to 20 mm, or from 2 to 10 mm. The thickness may be constant and uniform, or it may change as a function of position, as with a tapered or wedged light guide. If tapered, the light guide may be tapered in only one in-plane direction, e.g. either the x- or the y-axis, or it may be tapered in both principal in-plane directions.

The light guide may be substantially flat or planar, ignoring small amplitude surface variability associated with, e.g., diffractive surface structures. In some cases, however, the light guide may be non-flat, including simply curved, i.e., curved along only one principal in-plane direction, or complex curved, i.e., curved along both principal in-plane directions. The light guide may be entirely flat, entirely non-flat, or flat in some areas and non-flat in other areas. For light guides that are non-flat along a particular in-plane direction, the cross-sectional profile along such a direction may be, for example, a simple arc, or more complex non-straight contours. In some cases the light guide may deviate greatly from a flat structure, e.g., the light guide may be in the form of a solid or a hollow truncated hollow cone, wherein light injection can occur at the large end or the small end of the truncated cone, as desired.

Whether or not the light guide 112 is flat, the light guide may have an outer boundary or edge whose shape, when the light guide is seen in plan view, is curved, or piecewise flat (polygonal), or a combination of piecewise flat and curved. Examples of curved shapes are shapes with continuous arcs, such as circles, ovals, and ellipses, and shapes with discontinuous or undulating arcs, such as a sinusoid or sinusoid-like contour. Examples of piecewise flat shapes are triangles, quadrilaterals (e.g., squares, rectangles, rhombuses, parallelograms, trapezoids), pentagons, hexagons, octagons, and so forth. The piecewise flat shapes can provide a straight or flat side surface or edge for light injection from the discrete light sources, while curved shapes provide curved side surfaces for light injection.

The light guide is typically relatively rigid and self-supporting so that it does not substantially bend or deform under its own weight, but flexible light guides can also be used and may, if desired, be held in place using a support structure or frame, for example. The light guide may have a unitary construction, or it may be made from a plurality of components attached to each other with no significant intervening air gaps, e.g., a thin structured surface film attached to a flat, smooth major surface of a thicker plate using a clear optical adhesive.

The light guide may be made of any suitable low loss light-transmissive material(s), such as glasses, plastics, or combinations thereof. Materials that are low loss, e.g., low absorption and low scattering over visible wavelengths, are desirable so that guided-mode light can propagate from one side surface completely across the light guide with absorption/scattering losses that are small compared to losses due to out-coupling of such light by the diffractive surface features. Exemplary materials include suitable: glasses; acrylics; polycarbonates; polyurethanes; cyclo-olefin polymer/copolymers, including Zeonex™ and Zeonor™ materials sold by Zeon Chemicals L.P, Louisville, Ky.; silicones and elastomers; and pressure sensitive adhesives (PSAs) and other adhesives, including silicone adhesives, 3M™ VHB™ conformable acrylic foam tapes, and 3M™ OCA™ optically clear adhesives.

The device 110 also includes one or more discrete light sources 114a, 114b, which are preferably mounted at an edge or side surface of the light guide 112. The sources are discrete and small in size relative to the in-plane dimension (length or width) of the light guide. However, light sources that are discrete or limited in size need not be used, and may be replaced if desired with non-discrete light sources, including light sources whose emitting area is long and/or wide with respect to corresponding dimensions of the side surface of the light guide. The sources 114a, 114b are preferably solid state light sources such as light emitting diodes (LEDs), but other suitable light sources can also be used.

In this regard, "light emitting diode" or "LED" refers to a diode that emits light, whether visible, ultraviolet, or infrared, although in most practical embodiments the emitted light will have a peak wavelength in the visible spectrum, e.g. from about 400 to 700 nm. The term LED includes incoherent encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. Some packaged LEDs also include one or more phosphor materials that are excited by an ultraviolet or short wavelength visible LED die, and fluoresce at one or more wavelengths in the visible spectrum. An "LED" for purposes of this application should also be considered to include organic light emitting diodes, commonly referred to as OLEDs.

Light emitted by the sources such as sources 114a, 114b is injected into the light guide to provide guided-mode light, i.e., light that is predominantly trapped in the light guide by total internal reflection (TIR), ignoring the effect of any diffractive surface features. The light emitted by each individual source is visible, and may be broad band (e.g. white) or narrow band (e.g. colored such as red, yellow, green, blue). If colored narrow band sources are used, different colors can be combined to provide an overall white light illumination on the surface 122, or the colors can be uniform, or different from each other but combined in such a way as to provide a decorative colored (non-white) illumination on the surface 122.

Diffractive surface features 113 are provided on at least one major surface of the light guide. These surface features or structures may be exposed to air, or planarized with a tangible material such as a low (or high) refractive index material, or both (some exposed to air, some planarized) in a patterned arrangement. As discussed elsewhere herein, the diffractive surface features are sized and otherwise configured to couple guided-mode light out of the light guide by diffraction, such that different wavelengths are coupled out differently, e.g. in different amounts, different directions, and different angular distributions. The diffractive surface features may be tailored so that light from the edge-mounted light sources is emitted substantially equally from both major surfaces 112a, 112b of the light guide, or instead so that the light is preferentially emitted from one of the major surfaces, such as surface 112a, which may then be designated the output surface of the light guide. In the latter case, the device may be mounted in a specific orientation so as to efficiently illuminate a room, workspace, or other surface.

Although the diffractive surface features couple guided-mode light out of the light guide, the light guide and the diffractive surface features are preferably tailored so that non-guided-mode light, e.g., light originating from a source or object behind the light guide and incident on one of the major surfaces of the light guide, is minimally deviated (whether by diffraction or refraction) such that objects can be viewed through the light guide with low distortion. The low distortion may provide both aesthetic and utilitarian benefits. In FIG. 1, the distortion is low enough so that the user 120 can view and recognize the object 124 through the light guide 112. The object 124 may be the ceiling or another neighboring structure which neither generates light nor is part of the lighting device 110. Alternatively, the object 124 may generate light and may be a part of the lighting device 110, for example, it may be another edge-lit light guide with its own diffractive surface features, or it may be a more conventional light source such as a spotlight or light bulb with no diffractive surface features but connected to the light guide 112 and mounted such that most or at least some of the light it emits is directed through the light guide 112. Furthermore, the object 124 may be or include a graphic film disposed near or attached to the device 110.

The diffractive surface features 113 may be present over substantially all of the major surface 112a, or only a portion of the surface. If the diffractive surface features cover only certain portions of the surface, light from the edge-mounted light sources may be emitted from the light guide only in those portions.

Additional aspects of the diffractive surface features are discussed further below. One particularly noteworthy aspect is the patterned printing (not shown in FIG. 1 but shown in other figures below) provided on some of the diffractive surface features in shapes and/or patterns that are, at least when the device is turned on, visible to a user of the device as indicia, for example, when the user looks directly at the device.

In some cases, at least some of the diffractive surface features may optionally be non-straight in plan view, and light propagating within the light guide may interact with the diffractive surface features to produce at least one band that intersects the non-straight diffractive surface features. The band may be a bright band, or, in some cases, a dark band. The band changes in appearance (e.g. shape) as a function of the viewing position of an observer 120 relative to the lighting device 110. The non-straight diffractive features may be, for example, curved or segmented in shape, or may have an undulating or disjointed shape comprising curves and/or segments. However, in some cases, some or all of the diffractive surface features on one or both of the major surfaces of the light guide may be straight in plan view. Bright and/or dark bands can also be generated with the straight diffractive surface features when discrete light sources and/or discrete absorbers are used, but the shapes of such bands may not change curvature as a function of viewing position.

The lighting device 110, and the other lighting devices disclosed herein, can be used as a luminaire or similar lighting device for general illumination purposes or the like. The luminaire may be mounted in any desired position and orientation, e.g., on, within, or near a ceiling of a room, or on, within, or near a wall of a room, or mounted on a post, stand, or other support structure. The luminaire may be oriented parallel to the ceiling, or parallel to the wall, or at an oblique or intermediate angle with respect to the ceiling or wall.

Figure 2:
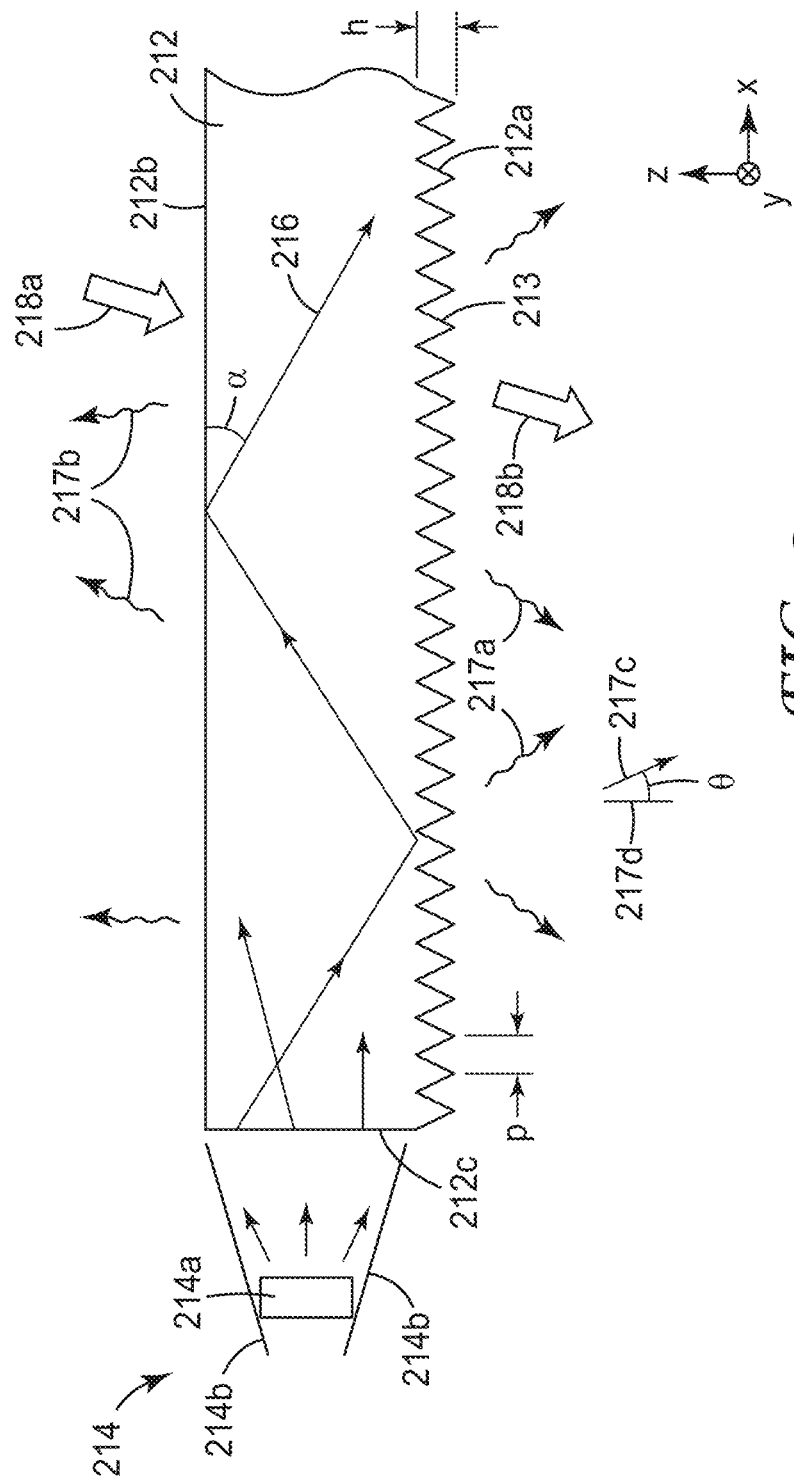
FIG. 2 is a schematic side or sectional view of a light guide with a discrete light source injecting light into the light guide and diffractive surface features coupling guided-mode light out of the light guide.

In FIG. 2, we see a schematic view of a light guide 212 with a light source such as a discrete light source 214 injecting light into the light guide, and diffractive surface features 213 coupling guided-mode light 216 out of the light guide to provide out-coupled light 217a, 217b. The light guide 212, which may be the same as or similar to the light guide 112 discussed above, has a first major surface 212a on which the diffractive surface features 213 are provided, a second major surface 212b opposite the first major surface, and a side surface 212c through which light from the light source 214 can enter the light guide. The light source 214 may include an active element 214a such as one or more LED dies which convert electricity into visible light, and one or more reflective members 214b which help direct some of the misdirected light from the element 214a into the side surface 212c of the light guide 212. Guided-mode light 216 from the light source 214 propagates via total internal reflection (TIR) along and within the light guide 212 over a range of angles α which may be measured relative to the local plane of the light guide, in this case, the x-y plane. Out-coupled light 217a, 217b may be measured or characterized, at least in part, by the polar angle θ between the direction of propagation of a given light ray 217c and an axis 217d normal to the local plane of the light guide, in this case, the z-axis. FIG. 2 also shows an incident light beam 218a impinging upon and entering the light guide 212 through the major surface 212b, propagating through the light guide 212 as non-guided-mode light, and exiting the light guide through the major surface 212a as transmitted light beam 218b. The transmitted beam 218b is preferably minimally deviated by the diffractive surface features 213 such that objects can be viewed through the light guide 212 with low distortion.

We will now elaborate on relevant design characteristics of the diffractive surface features 213 that allow them to provide the functional properties discussed above. Typically, the diffractive surface features 213 are grooves or ridges/prisms with well-defined faces that follow predetermined paths in plan view. For purposes of FIG. 2, we will assume for simplicity that the diffractive features 213 follow straight, linear paths that are parallel to each other and to the y-axis. This assumption is not as restrictive as it seems, because the straight, linear features can approximate a very small portion or section of diffractive surface features that follow curved paths in plan view, such as concentric circles or spiral arcs. We also assume for simplicity that the diffractive features 213 have a uniform center-to-center spacing known as "pitch", which is labeled "p" in FIG. 2. This assumption is also not as restrictive as it seems, because the uniformly spaced diffractive features 213 can approximate a very small portion or section of diffractive surface features whose pitch p changes as a function of position. The diffractive surface features 213 are also assumed to have a depth (grooves) or height (prisms) "h" as shown in FIG. 2.

The diffractive surface features 213 with the assumed linear configuration and constant pitch can be referred to as a single-pitch (or periodic) one-dimensional (1D) diffraction grating. The single-pitch 1D grating is directly coupled to, and forms the major surface 212a of, the light guide 212, which we assume has a refractive index of n and is immersed in air or vacuum. Light from the light source 214 of optical wavelength λ is injected or launched into the light guide 212 through the side surface 212c, and propagates primarily by TIR within and along the light guide as guided-mode light 216. When such light impinges upon and interacts with the diffractive surface features 213, a fraction (η) of the guided-mode light 216 is extracted as out-coupled light 217a, 217b. The out-coupled or extracted light 217a, 217b propagates along a direction that is orthogonal to the light guide surface (e.g. having a polar angle θ=0 in FIG. 2) when the following condition is met:

$$m \times (\lambda/n) = d \times \cos(\alpha). \quad (1)$$

In this equation: α refers to the angle at which the guided-mode light impinges on the grating surface, measured relative to the plane of the surface substantially as shown in FIG. 2; m is the diffraction order; n is the refractive index of the light guide 212; λ is the wavelength of light; and d is the grating pitch, which is labeled "p" in FIG. 2. For example, for green light with λ=530 nm launched on-axis (α=0 degrees) into an acrylic light guide having a refractive index n=1.5, the grating pitch d (or p) should equal 353 nm, and only the first diffraction order (m=1) is possible. For other values of α and λ, the extraction direction will in general no longer be orthogonal to the light guide surface.

A computer simulation can be used here to illustrate the angular distribution characteristics of extracted or out-coupled light as a function of the light source wavelength, for the single-pitch 1D diffraction grating. In order to fully characterize the angular distribution, both polar angle (angle θ in FIG. 2) and azimuthal angle (the angle measured in the x-y plane relative to a fixed direction or axis in the x-y plane) should be considered. For purposes of the simulation, for simplicity, we assume: that the light source 214 and the light guide 212 (including the diffractive surface features 213) extend infinitely along axes parallel to the y-axis; that the pitch d (or p) is 353 nm; and that the light source 214 has a Lambertian distribution in the x-z plane, i.e., an intensity proportional to the cosine of α, for light emitted by the light source 214 in air before impinging on the side surface 212c. After running the simulation with these assumptions, we calculate the total integrated optical power density as a function of the polar angle θ for 3 different optical wavelengths λ, and plot the results in FIG. 3. In that figure, curves 310, 312, 314 show the integrated optical power density for the optical wavelengths λ of 450 nm (blue light), 530 nm (green light), and 620 nm (red light), respectively.

Figure 3:
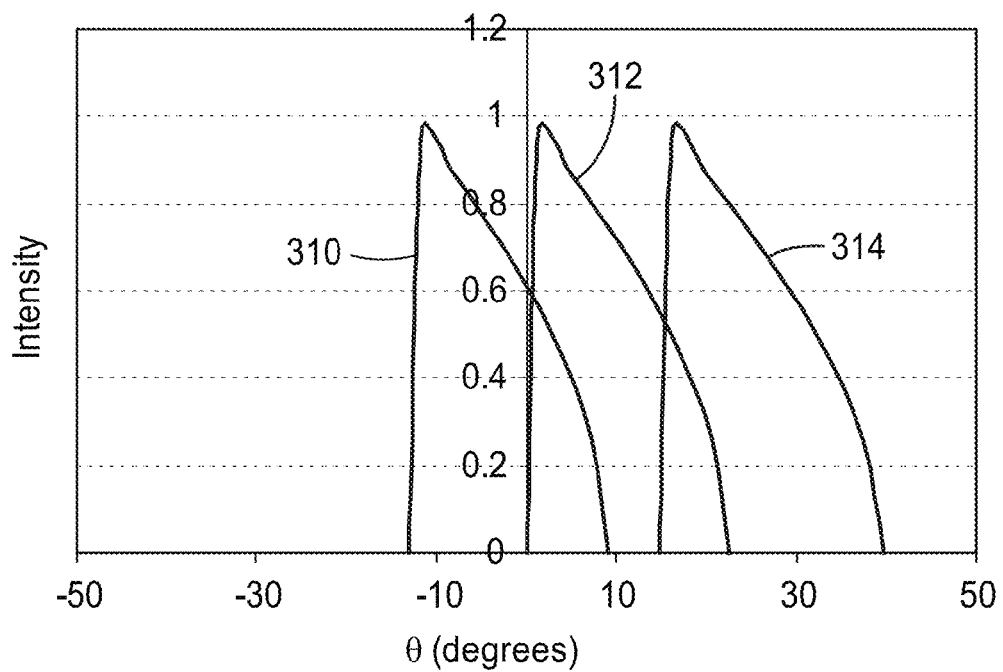
FIG. 3 is a graph of intensity versus polar angle of integrated optical power density for light extracted from a light guide using linear diffractive surface features.

The simulated results of FIG. 3 demonstrate, among other things, the wavelength-dependent nature of light extraction using diffractive surface features. Although the curves 310, 312, 314 overlap to some extent, their peak intensities occur at polar angles that differ from each other by more than 10 degrees, with the red and blue peaks being separated by almost 30 degrees.

In addition to the simulation, we also fabricated a single-pitch 1D diffraction grating to demonstrate its utility as a light extractor for a light guide. First, a diamond tip for a diamond turning machine (DTM) was shaped using a focused ion beam (FIB) to form a V-shaped diamond tip with an included angle of 45 degrees. This diamond tip was then used to cut symmetric, equally spaced V-shaped grooves around the circumference of a copper roll to make a diffraction grating master tool. A cast-and-cure replication process was then used to transfer the grating pattern from the master tool to a film substrate. A triacetate cellulose (TAC) film having a thickness of 3 mils (about 76 micrometers) was used as a base film or substrate due to its low birefringence and its refractive index value (n=1.5), which matches well to the refractive index of typical light guide materials. This base film was applied to the master tool with a thin acrylate resin coating therebetween. The acrylate resin composition comprised acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). Ultraviolet light from a mercury vapor lamp ("D" bulb) was used for both casting and post-curing the microreplicated resin on the base film. The casting roll temperature was set at 130 degrees F. (54 degrees C.), and the nip pressure was set at 20 to 25 psi (about 138,000 to 172,000 pascals).

Figure 4:
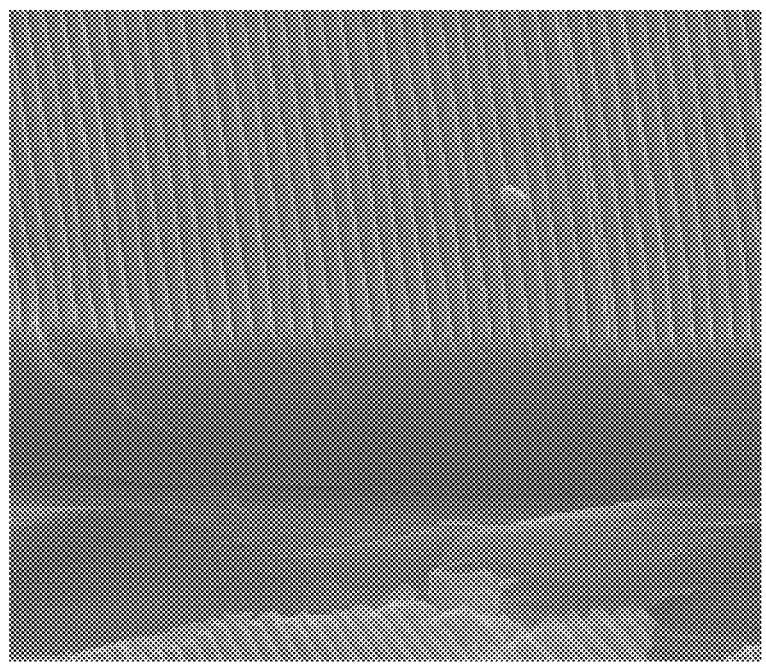
FIG. 4 is a micrograph of a replicated diffractive surface useful for light extraction from a light guide.

A microphotograph of the structured or grooved surface of the resulting diffraction grating film is shown in FIG. 4. The pitch of the diffractive surface features in this figure is about 400 nanometers, and the depth of the grooves (or height of the prisms) is about 500 nanometers.

This film was then laminated to a 2 mm thick acrylic plate, which was clear, flat, and rectangular, using a layer of optically clear adhesive (3M™ Optically Clear Adhesive 8172 from 3M Company, St. Paul, Minn.) such that the diffraction grating faced away from the acrylic plate and was exposed to air, and such that no significant air gaps were present between the base film of the diffraction grating film and the flat major surface of the acrylic plate to which the film was adhered. The laminated construction thus formed a light guide having the single-pitch 1D diffraction grating serving as diffractive surface features on one major surface of the light guide. The light guide included a flat, straight side surface extending parallel to the groove direction of the diffractive surface features, similar to the configuration of FIG. 2. A light source was constructed using a linear array of orange-emitting LEDs (obtained from OSRAM Opto Semiconductors GmbH), each LED having a center wavelength of about 590 nm and a full-width-at-half-maximum (FWHM) bandwidth of about 20 nm. The discrete character of the individual LEDs was masked by placing a diffuser plate (type DR-50 from Astra Products Inc., Baldwin, N.Y.) in front of the LEDs, i.e., between the LEDs and the side surface of the light guide, to provide illumination that was more spatially uniform. The light source thus approximated a linear light source emitting light that was approximately monochromatic at a wavelength of 590 nm.

Figure 5:
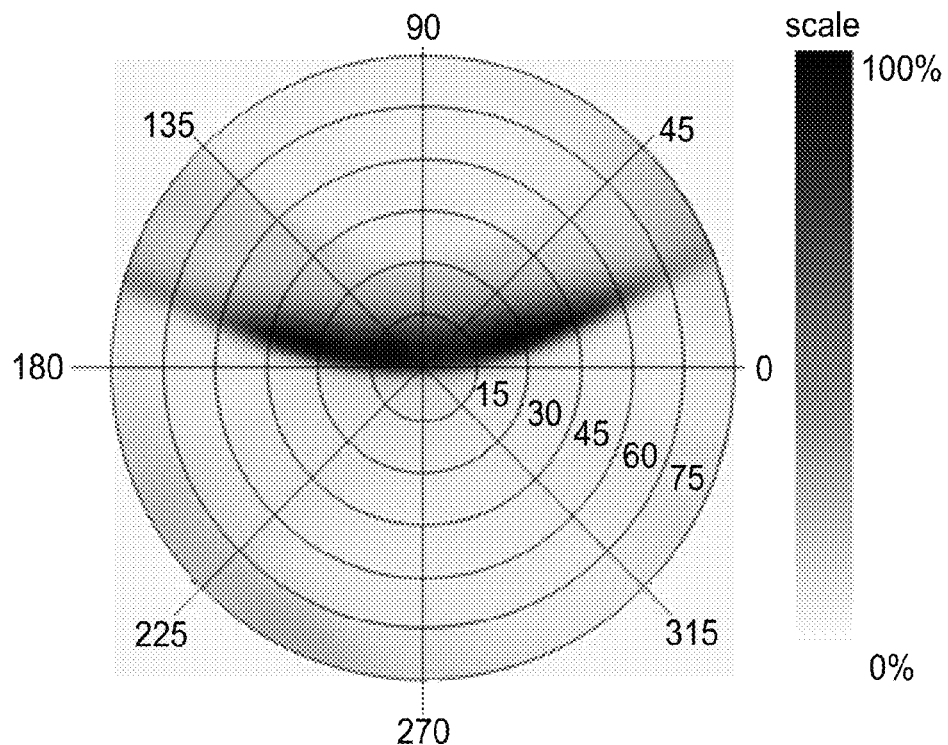
FIG. 5 is a conoscopic plot of measured intensity as a function of polar and azimuthal angle for a lighting device that used diffractive surface structures as shown in FIG. 4.

The light source was energized, and the intensity of the out-coupled light emitted through the diffractive surface features was measured as a function of polar angle and azimuthal angle using a conoscopic camera system. The measured conoscopic intensity distribution is shown in FIG. 5. In this figure, the direction of elongation of the light source, and the groove direction, corresponds to azimuthal values of 0 and 180 degrees. The measured intensity or luminance in an orthogonal reference plane, i.e., in a plane corresponding to azimuthal values of 90 and 270 degrees in FIG. 5, is plotted as a function of polar angle θ in FIG. 5a. The reader may note the similarity of the curve in FIG. 5a relative to the shape of the curves 310, 312, 314 in FIG. 3. The reader may also note in reference to FIG. 5 that light is extracted by the 1D diffraction grating in a narrow crescent-shaped distribution that does not lie in a plane, but that shifts in azimuthal angle as a function of polar angle.

Other aspects of the extended area lighting device discussed in connection with FIGS. 4, 5, and 5a include: light is extracted or out-coupled equally from both major surfaces of the light guide (see e.g. surfaces 212a, 212b of FIG. 2), which is a result of the symmetric design of the diffractive surface features (i.e., the symmetric V-shaped grooves that form the linear diffraction grating); if the monochromatic source is replaced with a white light source and/or multi-colored light sources, angular color separation will occur as a result of the diffraction phenomenon (see e.g. FIG. 3); no diffuser component is needed in the device (although in the embodiment of FIGS. 5 and 5a one is included in the light source to mask the discrete nature of the LED light sources) due to the fact that TIR is relied upon to allow the guided-mode light to propagate along the waveguide, and diffraction is relied upon to extract or out-couple the light from the light guide; and the crescent-shaped distribution of out-coupled light is characterized by a relatively narrow light extraction angle.

Figure 6:
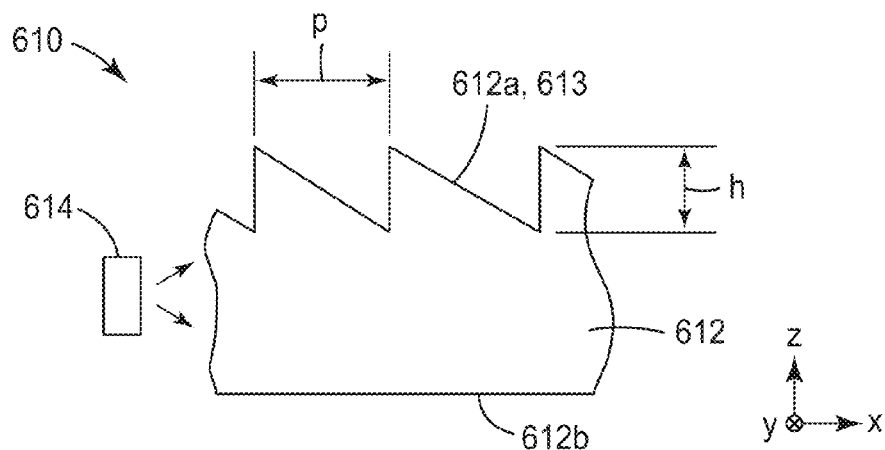
FIG. 6 is a schematic side or sectional view of a light guide having asymmetric or blazed diffractive surface structures.

Guided-mode light may be extracted or out-coupled preferentially through one major surface of the light guide rather than the other major surface by changing the shape of the diffractive surface features, in particular, making the shape of the individual features (e.g. prisms) asymmetrical. We demonstrate this in connection with FIGS. 6 and 7. In FIG. 6, a lighting device 610 includes a light guide 612 having a first major surface 612a and an opposed second major surface 612b. The first major surface 612a comprises diffractive surface features 613 in the form of facets which form right-angle prism structures of height "h" and pitch "p". The device 610 also includes a light source 614 disposed proximate a side surface of the light guide 612 to inject light into the light guide as guided-mode light, such light propagating generally from left to right from the perspective of FIG. 6. A computer simulation of the device 610 was performed. In the simulation, for simplicity, the prism structures of the diffractive surface features 613 were assumed to be equally spaced, and extending linearly along axes parallel to the y-axis. The light source was also assumed to extend linearly parallel to the y-axis, and was assumed to emit polarized light of wavelength $\lambda$ into air in a Lambertian distribution in a first reference plane parallel to the plane of the light guide (see the x-y plane in FIG. 2), this light then being refracted at the side surface of the light guide. The simulation assumed only one propagation angle of light, $\alpha=5$ degrees as referenced in FIG. 2, in a second reference plane (see the x-z plane in FIG. 2) perpendicular to the first reference plane. The refractive index of the light guide was assumed to be 1.5. The optical wavelength $\lambda$ and the grating pitch p were initially selected such that the out-coupled light was extracted orthogonal to the light guide surface for first order diffraction (m=1), which yielded $\lambda \approx 520$ nm and p$\approx$350 nm. The grating height h was then varied over a range from 50 to 500 nm, while the pitch p was held constant at 350 nm. For each embodiment associated with a specific value for the grating height, the following quantities were calculated by the computer simulation software:

extraction efficiency for transverse magnetic (TM) polarized light extracted from the first major surface 612a, referred to here as TM-top extraction efficiency;

extraction efficiency for transverse electric (TE) polarized light extracted from the first major surface 612a, referred to here as TE-top extraction efficiency;

extraction efficiency for transverse magnetic (TM) polarized light extracted from the second major surface 612b, referred to here as TM-bottom extraction efficiency; and extraction efficiency for transverse electric (TE) polarized light extracted from the second major surface 612b, referred to here as TE-bottom extraction efficiency.

In this regard, "extraction efficiency" refers to the amount (expressed as a percentage) of specified light (TM or TE) extracted from the specified major surface (612a or 612b) for a single interaction, divided by the amount of such specified light propagating within the light guide immediately before the interaction of the light beam with the extraction surface.

Figure 7:
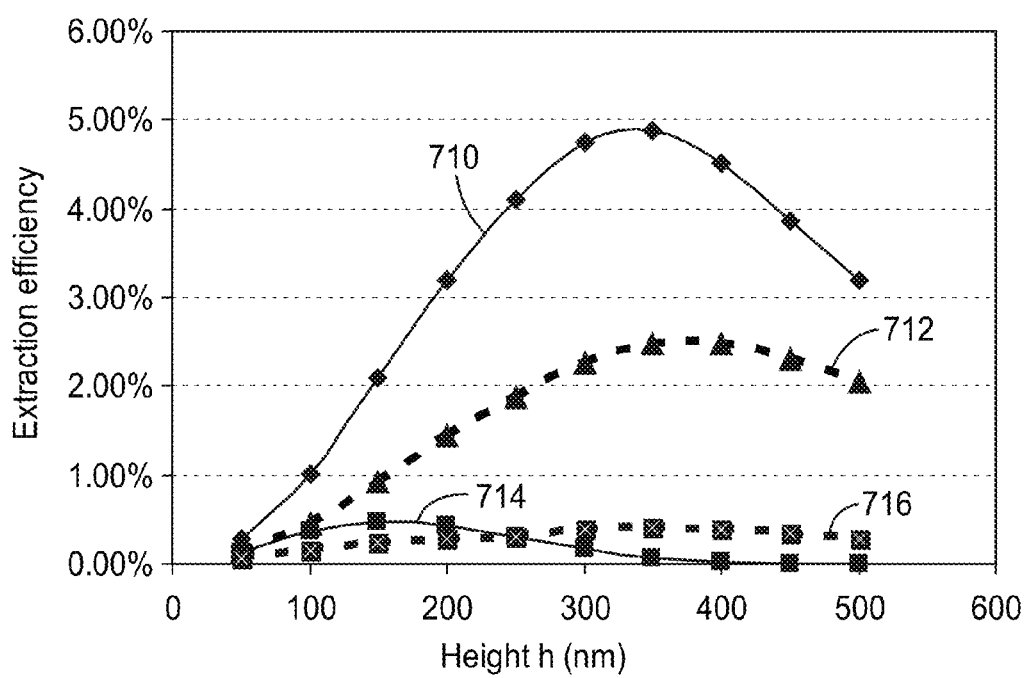
FIG. 7 is a graph of calculated extraction efficiency for the surface structures of FIG. 6.

The calculated quantities are plotted in FIG. 7, where curve 710 is the TM-bottom extraction efficiency, curve 712 is the TE-bottom extraction efficiency, curve 714 is the TM-top extraction efficiency, and curve 716 is the TE-top extraction efficiency. These results demonstrate that guided-mode light can be extracted preferentially through one major surface of the light guide by making the shape of the individual diffractive features (e.g. prisms) asymmetrical. The results also demonstrate that the degree to which light is preferentially extracted from one major surface depends on details of the particular shape of the diffractive features. In the case of right-angle prism features, preferential extraction can be maximized by selecting a height h approximately equal to the pitch p.

The diffractive surface features may be tailored so that light emitted from one major surface of the light guide (e.g. out-coupled light 217a in FIG. 2) is the same as, or similar to, the light emitted from the opposed major surface of the light guide (e.g. out-coupled light 217b in FIG. 2). The light emitted from the opposed surfaces may be the same with respect to color, intensity, and/or the angular distribution of color and/or intensity of the out-coupled light. In one approach, diffractive surface features may be provided on both opposed major surfaces, and these diffractive surface features may be mirror images of each other with respect to a reference plane disposed between and equidistant from the opposed major surfaces, such that the lighting device possesses mirror image symmetry with respect to such a reference plane. In alternative embodiments, the diffractive surface features may be tailored so that light emitted from one major surface of the light guide is substantially different from the light emitted from the opposed major surface of the light guide. The light emitted from the opposed surfaces may be different with respect to color, intensity, and/or the angular distribution of color and/or intensity of the out-coupled light. For example, an observer may perceive that light of one color is emitted from one major surface, and light of a substantially different color is emitted from the opposed major surface. In a horizontally-mounted lighting device, white light sources may be used with suitably tailored diffractive surface features such that white light of a relatively cool color temperature (bluish tint) is directed upwards towards the ceiling, and white light of a relatively warmer color temperature (reddish tint) is directed downwards towards the floor, or vice versa.

In applications where the angular separation of different colors of light due to diffraction is undesirable, several design approaches can be used to overcome the color separation issue. In one approach, shown in FIG. 8, two or more light guides can be stacked together. In another approach, shown in FIG. 9, different diffractive surface features are disposed on opposite major surfaces of a given light guide, and tailored for different colored light sources. In still another approach, shown in FIGS. 10 and 11, the diffractive surface features on a given major surface of a light guide may include groups of surface features of different pitches. Note that although these approaches are presented in connection with dealing with the color separation issue, they may also be used for other purposes including utilitarian and/or aesthetic purposes in which color separation still occurs, or in single-color embodiments that employ only light sources of a given desired (non-white) color. Note also that although the various approaches are described individually, any two or more of the approaches can be combined together and used in a single embodiment.

Figure 8:
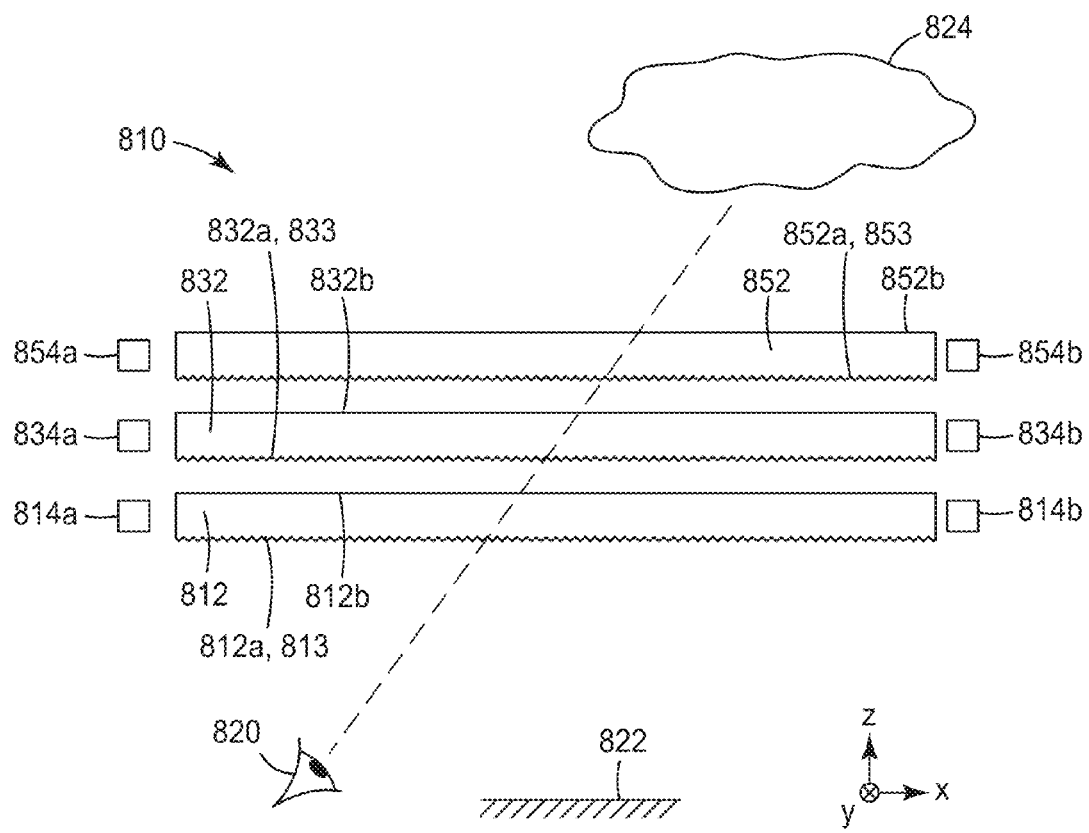
FIG. 8 is a schematic side or sectional view of a lighting device that includes a plurality of light guides in a stacked or layered arrangement.

Turning then to FIG. 8, we see there a schematic view of a lighting device 810 that includes a plurality of light guides 812, 832, 852 in a stacked or layered arrangement. Each light guide has a pair of opposed major surfaces, i.e., light guide 812 has major surfaces 812a, 812b, light guide 832 has major surfaces 832a, 832b, and light guide 852 has major surfaces 852a, 852b. At least one major surface of each light guide preferably includes diffractive surface features, for example, major surface 812a may include diffractive surface features 813, major surface 832a may include diffractive surface features 833, and major surface 852a may include diffractive surface features 853. The device 810 also includes light sources 814a, 814b, 834a, 834b, 854a, 854b arranged as shown to inject light into the respective light guides e.g. through their respective side surfaces, so as to provide guided-mode light in the light guides. Preferably, each of the light guides (including their diffractive surface features) has a low optical distortion such that non-guided-mode light can pass through the light guide relatively undisturbed. In this way, light extracted from the light guide 832 by the diffractive surface features 833 can pass through the light guide 812 to reach a user 820 and/or surface 822, and light extracted from the light guide 852 by the diffractive surface features 853 can pass through both light guide 812 and light guide 832 to reach the user 820 and/or surface 822. Furthermore, the user 820 may also observe objects such as object 824, which may be the same as or similar to object 124 discussed above, through the stack of light guides 812, 832, 852 with little or no optical distortion.

If it is desirable to overcome the color separation issue, the various light guides, light sources, and diffractive surface features in the device 810 may be tailored to provide different colors of out-coupled light to the user 820 and/or surface 822 so that the sum of all such light provides substantially white light illumination. For example, the light sources 854a, 854b may emit red light and the diffractive surface features 853 may optimally extract such light along an optical axis (e.g. an axis parallel to the z-axis) of the device, and the light sources 834a, 834b may emit green light and the diffractive surface features 833 may optimally extract the green light along the same optical axis, and the light sources 814a, 814b may emit blue light and the diffractive surface features 813 may optimally extract the blue light along the same optical axis. Of course, red, green, and blue in the order described are merely examples, and the reader will understand that a multitude of alternative combinations are contemplated. Furthermore, although three light guides are shown in the stack of FIG. 8, other numbers of light guides, including two, four, or more, can also be used. The constituent components of each layer within the stack may all have the same or similar design, e.g., the same light guide dimensions and characteristics, the same dimensions and characteristics of the diffractive surface structures, and the same numbers, colors, and arrangements of LEDs. Alternatively, the constituent components of each layer may differ from corresponding components in other layers in any of these respects. Similar to lighting device 110, the device 810 may provide substantially white light illumination on the surface 822, while providing a colored appearance when the user 820 looks directly at the device 810. Also, the user desirably sees spatial pattern(s) such as indicia in the emitting area of the device 810, which pattern(s) or indicia may originate with any one, or some, or all of the layers within the stack.

Figure 9:
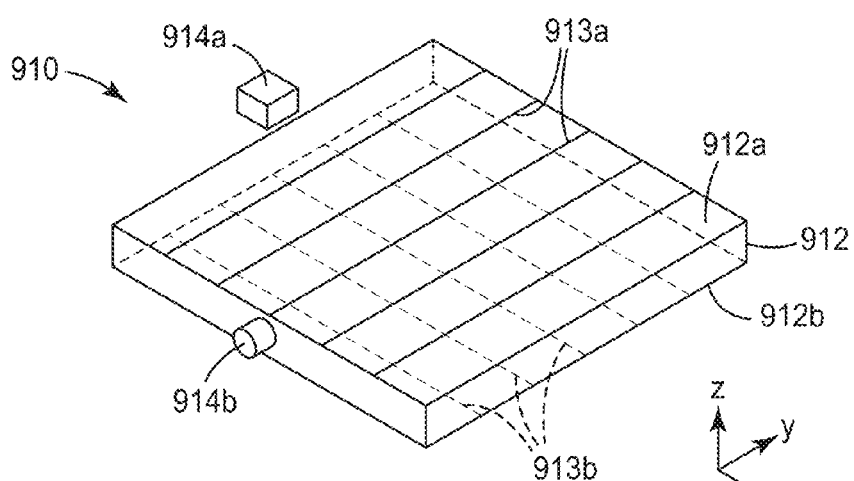
FIG. 9 is a schematic perspective view of a lighting device that includes different diffractive surface features disposed on opposite major surfaces of the light guide and tailored for different colored light sources.

Turning to FIG. 9, we see there a schematic view of a lighting device 910 that includes a light guide 912, and light sources 914a, 914b disposed to inject light into different (e.g. orthogonal) side surfaces of the light guide. The light guide 912 has a pair of opposed major surfaces 912a, 912b. In device 910, each major surface has its own diffractive surface features: surface 912a has diffractive surface features 913a, and surface 912b has diffractive surface features 913b. The diffractive surface features are represented only schematically in the figure, but indicate that features 913a extend generally parallel to one in-plane axis (e.g. the y-axis), and the features 913b extend generally parallel to an orthogonal in-plane axis (e.g. the x-axis). The light sources are likewise positioned and configured to inject light generally along orthogonal in-plane directions, with source 914a disposed to inject light generally along the x-axis and source 914b disposed to inject light generally along the y-axis. The term "generally" is used here because the light sources need not be (and in many cases are not) collimated, but emit light in a distribution of angles in the x-y plane. Also, although the sources 914a, 914b are each shown as a discrete point source such as a single LED emitter, they may alternatively each be a linear array of such discrete sources extending along the respective side surface of the light guide, or a linear or bar-shaped extended source. Nevertheless, light from the source 914a propagates predominantly along the in-plane x-axis, such that it interacts strongly with the diffractive surface features 913a and weakly with the diffractive surface features 913b, and light from the source 914b propagates predominantly along the in-plane y-axis, such that it interacts weakly with the features 913a and strongly with the features 913b.

This selective coupling of the light sources to different respective diffractive surface features on the light guide using geometry or directionality can, if desired, be used to address the color separation issue. For example, the light sources may be substantially complementary in their emission spectra, e.g., source 914a may emit blue light and source 914b may emit yellow light, in which case the diffractive surface features 913a may be configured to extract blue light along a given direction such as an optical axis (e.g. the positive z-axis) of the lighting device 910, while the diffractive surface features 913b may be configured to extract yellow light along the same direction, so as to provide substantially white light illumination along the optical axis. There is little interaction between the blue or yellow light with the diffractive surface features (light extraction grating) of the opposite color because, as explained above, the grooves for blue light extraction extend generally along the light path of the yellow light, the grooves for yellow light extraction extend generally along the light path of the blue light. The different colored light beams are thus guided and extracted independently in the same light guide. The combined visual effect of the out-coupled blue and yellow light gives rise to a sensation of white light to an observer or user. The color rendering index (CRI) of the white light in this example may however be relatively low, because the light guide 912 combines only two colors.

The approach shown in FIG. 9 can be extended to numerous other embodiments, including embodiments that use light sources of other colors, including combinations of different complementary colors, and colors that are not complementary, including also colors that may be the same (e.g. green-emitting light for both sources 914a and 914b, or red-emitting light for both sources). Also, a lighting device such as device 910 can be combined with other lighting devices of similar or different design, e.g. in a stacked arrangement as described in connection with FIG. 8. In such a case, each light guide may be configured to emit a combination of two distinct colors, and the colors collectively emitted from the stack may be selected to produce white light with a higher CRI, if desired.

Another approach that may be used to address the color separation issue is the approach shown generally in FIGS. 10 and 11. In these figures, light guides 1012, 1112 are shown in which the diffractive surface features on a given major surface include groups or packets of surface features of different pitches. The multiple different pitches can be used generally to provide a desired distribution of various wavelengths of extracted light from the light guide, assuming light of such wavelengths is injected into the light guide by one or more light sources (not shown).

As mentioned elsewhere, the light guides disclosed herein may have a variety of different constructions, including a unitary construction, or a layered construction in which two or more components are attached to each other with no significant intervening air gaps. In this regard, the light guides 1012, 1112 are shown to have layered constructions, but they may be readily modified to have a unitary construction if desired. Conversely, light guides shown as being unitary in other figures may be readily modified to have layered constructions. In reference to FIG. 10, the light guide 1012 includes a relatively thick plate or other substrate 1011a, to which is attached a film made up of a carrier film 1011b on which a prism layer 1011c has been cast and cured. The substrate 1011a, carrier film 1011b, and prism layer 1011c preferably have the same or similar index of refraction, and are preferably all highly transmissive to visible light, with little or no scattering or absorption, although in some cases a controlled amount of absorption and/or scattering may be acceptable or even desirable. In reference to FIG. 11, the light guide 1112 may have a similar construction to light guide 1012, and thus may include a relatively thick plate or other substrate 1111a, to which is attached a film made up of a carrier film 1111b on which a prism layer 1111c has been cast and cured.

Attachment of a prismatic or structured surface film to a plate or other substrate to provide a layered light guide can be done by any suitable technique. For example, attachment can be achieved using a suitable adhesive, such as a light-transmissive pressure sensitive adhesive. Attachment may also be achieved using injection molding processes, including insert injection molding processes. Chemical bonds can also be used for attachment, e.g., when a curable resin is cast and cured on a suitable substrate such as a carrier film. Alternatively, in the case of unitary constructions, the diffractive surface features can be formed on at least one surface of a unitary substrate such as a film or plate, e.g. by embossing or molding, including for example injection molding processes. Compression molding, extrusion replication, and direct cutting are additional techniques that may be used to form the diffractive surface features. Regardless of whether the diffractive structures are formed on the surface of a film, plate, or other substrate, the diffractive surface features may be fabricated using any suitable technique now known or later developed. Additional methods that can be used to make suitable diffractive surface features are discussed in one or more of: WO 2011/088161 (Wolk et al.); US 2012/0098421 (Thompson); and US 2012/0099323 (Thompson).

The light guides 1012, 1112 have respective first major surfaces 1012a, 1112a, and respective second major surfaces 1012b, 1112b opposite the first surfaces, as well as side surfaces (not shown). Similar to other light guides described herein, the first major surfaces 1012a, 1112a are configured to have diffractive surface features 1013, 1113, respectively. The surface features may be referred to as grooves or prisms. The grooves/prisms are shown as having an asymmetric 90 degree sawtooth profile in cross section, but other profiles can also be used as desired including other asymmetric profiles and symmetric (e.g. V-shaped) profiles. In plan view the grooves/prisms may follow paths that are straight, curved, or both (e.g. straight in some places and curved in other places). Significantly, the diffractive surface features 1013, 1113 are arranged into groups or packets, the prisms or grooves in any given packet having a uniform pitch but adjacent packets having different pitches. In some cases, the packets can be arranged in patterns that repeat across the surface of the light guide, the smallest repeating group of packets being referred to here as a "set" of packets. For example, light guide 1012 (FIG. 10) has diffractive surface features 1013 which is divided into groove or prism packets 1030, 1031, and 1032, these packets being arranged in a repeating sequence which defines sets 1040. The prisms or grooves in each of packets 1030, 1031, 1032 have a uniform pitch, but the pitch in packet 1030 is less than that in packet 1031, which in turn is less than that in packet 1032. Light guide 1112 (FIG. 11) has diffractive surface features 1113 which is divided into groove or prism packets 1130, 1131, 1132, 1133, 1134, and 1135. These packets may also be arranged in a repeating sequence to define set 1140. The prisms or grooves in each of packets 1130, 1131, 1132, 1133, 1134, and 1135 have a uniform pitch, but the pitch gets progressively larger as one moves from packet 1130 to packet 1135. Note that although different pitches are used in the various packets shown in FIGS. 10 and 11, preferably every one of the pitches is in a range suitable for coupling some visible guided-mode light out of the light guide by principles of diffraction.

The width (in-plane transverse dimension) of the packets and the width of the sets of packets, when the light guide is seen in plan view, may be small enough so that they are visually imperceptible to the ordinary observer. Alternatively, the width of the packets and/or the widths of the sets of packets may be large enough so that they are perceptible as indicia or as an aesthetic pattern to the ordinary observer. If the packets are designed to form perceptible indicia, such pitch-related indicia may in some cases be made to be in registration with indicia formed by the patterned printing on the diffractive surface features, while in other cases the pitch-related indicia may not be in registration with the indicia formed by the patterned printing, e.g., the pitch-related indicia may partially overlap the patterned printing indicia, or there may be no overlap between the pitch-related indicia and the patterned printing indicia.

Multiple pitch extraction designs such as those depicted in FIGS. 10 and 11 can be used for color mixing. Generally speaking, at least two different packets, characterized by two different pitches, can be used, but in many cases at least three different packets, characterized by three different pitches p1, p2, p3, are desirable. The choice of the pitch dimension is a function of the refractive index (n) of the light guide, as well as a function of the wavelength of light ($\lambda$) we wish to extract from the light guide with the given packet. In an exemplary case we may select $p1=\lambda 1/n$, where $\lambda 1$ is in a range from 400 to 600 nm, and $p2=\lambda 2/n$, where $\lambda 2$ is in a range from 500 to 700 nm, and $p3=\lambda 3/n$, where $\lambda 3$ is in a range from 600 to 900 nm. In the case of light guides made of acrylic (n≈1.49) or similar materials, these conditions correspond to a pitch p1 in a range from about 268 to 403 nm, p2 in a range from about 336 to 370 nm, and p3 in a range from 403 to 604 nm. Polychromatic light such as white light propagating within the light guide interacts with the multiple pitch packets so that light of different colors is diffracted (out-coupled or extracted from the waveguide) at different angles for each given packet, the extraction angle for any given color also being different for the different packets. As a result, light of the various colors can be mixed or combined to provide illumination with substantial color uniformity, e.g. substantially white light, for users or objects disposed at a suitable distance from the light guide.

In exemplary embodiments, the lighting device may utilize a plurality of light sources having different spectral outputs, and a controller can be used to independently control the different light sources to actively or dynamically control the perceived color of the light emitted by the lighting device. This active control can be used to adjust or otherwise change the color temperature, correlated color temperature, and/or the color rendering index (CRI) of the output light. Assemblies or combinations of red, green, and blue-emitting LEDs (RGB), or red, green, blue, and white-emitting LEDs (RGBW), are of particular benefit for this purpose. Also, light guides that incorporate a multiple pitch extraction design are also of particular benefit. Preferably, the multiple pitch design incorporates at least one packet of diffractive features of a given pitch for each narrow-band emitting light source, e.g., one or more packets whose pitch is tailored for red light, one or more packets whose pitch is tailored for green light, one or more packets whose pitch is tailored for blue light, and so forth. Note that individual narrow band colors are not limited to red, green, and blue, and light sources that emit other non-white colors such as yellow or amber may also be used to expand the color gamut of the disclosed lighting devices.

A design parameter of interest for the multi-pitch grating design, as well as for other disclosed diffractive surface feature designs, is the effective extraction efficiency. Extraction efficiency was discussed above and will not be repeated here. The "effective" extraction efficiency refers to the percentage of specified light extracted from the specified major surface (612a or 612b) upon a single interaction, divided by the amount of such specified light propagating within the light guide immediately before the interaction with the extraction surface. The effective extraction efficiency for diffractive surface features (grooves or prisms) of a given pitch can be evaluated and compared to the effective extraction efficiencies of other pitches. In general with given system parameters, the effective extraction efficiency of a given pitch: is a linear function of (i.e., directly proportional to) the plan-view area coverage of diffractive features having that pitch (e.g., for the smallest pitch in FIG. 10, the sum of the plan-view areas of the three packets 1030 on the surface); and also depends on other factors including the pitch of the diffractive features and the cross-sectional profile shape of the diffractive features (grooves/prisms). In order to obtain substantial color uniformity, it is desirable to ensure that the effective extraction efficiencies for the different pitches are comparable to each other, e.g., the ratio of effective extraction efficiencies for any two distinct pitches preferably lies within the range from about 0.3 to 3.

Figure 5A:
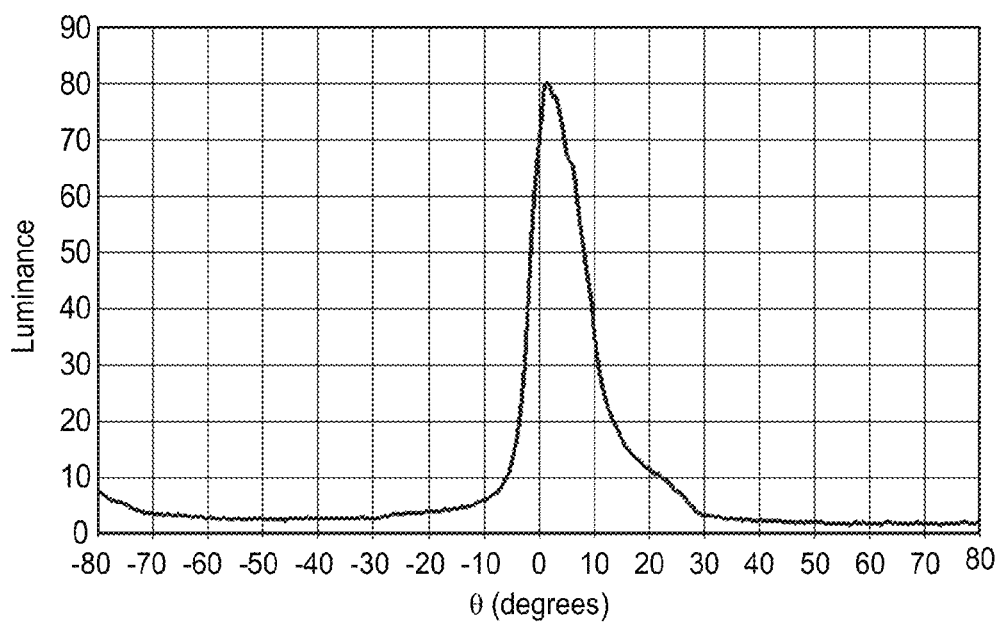
FIG. 5a is a graph of measured luminance versus polar angle along a particular reference plane for the conoscopic plot of FIG. 5.

As we saw in connection with FIGS. 4, 5, and 5a, a monochromatic Lambertian light source used to inject light into a light guide having a single pitch linear diffraction grating gives rise to a crescent-shaped distribution of out-coupled light characterized by a relatively narrow light extraction angle. If even further angular narrowing of the out-coupled light is desired, the light source can be reconfigured with suitable lenses, mirrors, or other components to emit light that is collimated or nearly collimated rather than Lambertian. Conversely, if angular widening of the out-coupled light is desired, the light source can be reconfigured to emit light over a broader angular range than a Lambertian distribution. Microstructured optical films can be combined with light sources such as LEDs or lasers to tailor the angular spread of light injected into the light guide, thereby also affecting the angular spread of the out-coupled light. Suitable microstructured optical films are described in PCT Patent Publications WO 2012/075352 (Thompson et al.) and WO 2012/075384 (Thompson et al.). These optical films, which may be referred to as uniformity tapes, are applied directly to the edge or side surface of a light guide and comprise refractive structures facing outward toward the light source to enhance coupling of light into the light guide. The refractive structures may alternatively be incorporated directly into the side surface or injection edge of the light guide, e.g. by injection molding, embossing, or direct machining. Such optical films or refractive structures, when disposed between an LED source and the side surface of a light guide, can broaden the angular spread of light injected into the light guide, and can be used with one, some, or all of the light sources in any of the embodiments disclosed herein. Optical films with custom designed replicated structures can also be used with coherent lasers to provide a well-defined rectangular-shaped angular distribution of light (i.e., a light distribution of approximately constant intensity over a specified cone of angles, and zero or near zero intensity outside the specified cone) for injection into the light guide.

The angular spread of the out-coupled light can also be tailored by appropriate selection of the physical width (in-plane transverse dimension) of the packets of diffractive features, where the physical width is measured orthogonally to the direction of elongation of the prisms/grooves. The physical width of each packet affects all colors of light interacting with the packet, and the overall extracted light is an average effect of all the packets. Physical widths that are small tend to broaden the angular width of the out-coupled light, while physical widths that are large tend to narrow the out-coupled light angular width. However, the amount of angular broadening or narrowing that can be achieved by physical width adjustment is somewhat limited because physical widths that are too small can lead to excessive light spreading such that the diffractive surface features produce a high degree of distortion or scattering, and such that the light guide appears to be diffusive rather than diffractive.

Another technique for producing illumination that is more angularly dispersed (for better spatial uniformity at remote surfaces) is to use a pattern of diffractive surface features oriented along different in-plane directions, e.g., corresponding to different azimuthal angles in the conoscopic plot of FIG. 5. The differently oriented diffractive features are preferably also combined with corresponding light sources that emit light generally along different in-plane directions tailored for maximum extraction efficiency with the corresponding diffractive features. The combination of the variously oriented diffractive features and the variously oriented light sources can produce out-coupled light emitted at a variety of azimuthal directions, resulting in illumination that is more angularly dispersed and more spatially uniform. In an exemplary embodiment, at least three distinct diffractive feature orientations can be used, corresponding to in-plane axes separated from each other by azimuthal angles of 120 degrees.

Differently oriented diffractive features can also be achieved through the use of continuously curved grooves or prisms, e.g., grooves or prisms that are circular, oval, or elliptical in shape (in plan view), or portions of such shapes, e.g., arcs, including series of interconnected arcs such as in sinusoidal or otherwise undulating shapes. In that regard, embodiments disclosed herein that are described as having linear diffractive surface features can alternatively employ diffractive features that are curved. Linear or curved diffractive surface features, when combined with discrete light sources and/or non-uniform reflective structures, can be used to produce visual features in the form of bright or dark bands. Bands such as these are highly undesirable in most extended source applications, but in some cases can be exploited to provide the lighting device with an aesthetic 3-dimensional appearance that can enhance the appearance of the pattern(s) or indicia provided by the patterned printing discussed above. Such patterned printing will now be discussed further, beginning with FIG. 12.

In FIG. 12 a portion of a lighting device 1210 is shown schematically. The device 1210 includes a light guide 1212 having a first major surface 1212a, an opposed second major surface 1212b, and at least one edge or side surface (not shown) at which one or more light sources (not shown) are disposed to inject light into the light guide 1212. The major surface 1212a comprises diffractive surface features 1213 which, in the depicted device portion, are coincident with the major surface 1212a. The diffractive surface features 1213 are as described elsewhere herein, and may be: single-pitch over the entire major surface 1212a, or multi-pitch and arranged into packets; symmetric or asymmetric in cross-sectional profile; straight or non-straight (including curved) in plan view; sized, in both pitch and height or depth, to extract or out-couple a significant amount of guided-mode light out of the light guide by diffraction; and composed of a material having a given refractive index for visible wavelengths.

The lighting device 1210 also includes a discontinuous or patterned light transmissive layer 1221 atop the major surface 1212a. The patterned light transmissive layer 1221 is composed of a light transmissive medium and has portions 1221a, 1221b, 1221c in optical contact with diffractive surface features 1213 in selected areas or regions 1251, but not in remaining regions 1250. The medium of layer 1221 is a tangible material such as a polymer, adhesive, or gel, for example, which has a given refractive index for visible wavelengths. In the remaining regions 1250 not covered by the layer 1221, the diffractive surface features 1213 are exposed to air or vacuum of refractive index 1.0.

By changing the refractive index of the medium the diffractive features 1213 are exposed to, the patterned layer 1221 has the effect of changing the extraction characteristics of the diffractive surface features 1213 in the regions 1251, relative to the regions 1250 unaffected by the patterned layer. Of relevance here are the refractive indices of three elements: the diffractive surface features 1213, i.e., the prisms which form the diffractive surface features; the optical medium or material of layer 1221, which is in optical contact with the diffractive features 1213 in regions 1251; and the optical medium (air, in this embodiment) in optical contact with the diffractive features 1213 in the remaining regions 1250. In general, the greater the difference in refractive index between the diffractive surface features 1213 and the medium they are in optical contact with, the greater or stronger the extraction efficiency of the diffractive features. Conversely, the smaller the difference in refractive index between the diffractive surface features 1213 and the medium they are in optical contact with, the smaller or weaker the extraction efficiency of the diffractive features.

Thus, if a large contrast in extracted light is desired between the regions 1250 and 1251, e.g. to produce highly visible indicia when the lighting device 1210 is turned on, then the material of layer 1221 may be selected so that a second refractive index difference ("dn2"), between the refractive index of the layer 1221 and that of the diffractive features 1213, is as different as possible from a first refractive index difference ("dn1"), between the refractive index of air and that of the diffractive features 1213. For example, if the diffractive surface features 1213 are made of a polymer of refractive index 1.5, then dn1 is 0.5 (=1.5−1.0), and the material of layer 1221 may be chosen so that dn2 is substantially smaller in magnitude than 0.5, e.g., a refractive index for layer 1221 of 1.45 or 1.55 yields a magnitude of dn2=0.05, and a refractive index for layer 1221 of 1.49 or 1.51 yields a magnitude of dn2=0.01. The magnitude of dn1 may be at least 0.1, 0.2, 0.3, 0.4, or 0.5, and dn2 may be less than half that of dn1, i.e., no more than 0.05, 0.1, 0.15, 0.2, or 0.25, respectively; dn2 may also be close to zero in magnitude, e.g., less than 0.05, 0.04, 0.03, 0.02, or 0.01. These values should not be considered limiting, however, and the refractive indices of the various layers may be chosen as desired to produce the desired amount of contrast between the regions 1250 and 1251. Note that if the material of layer 1221 is selected to match the refractive index of the diffractive features 1213, such that the magnitude of dn2 is substantially zero, diffractive surface features 1213 effectively disappear in the regions 1251 from an optical standpoint, and no light extraction occurs in those regions so long as the upper exposed surface of layer 1221 is flat and smooth to promote TIR of guided-mode light.

If on the other hand a small contrast in extracted light is desired between the regions 1250 and 1251, e.g. to produce a subtle or barely visible indicia when the lighting device 1210 is turned on, then the material of layer 1221 may be selected so that the magnitude of dn2 is very close to that of dn1. For example, if the diffractive surface features 1213 are made of a polymer of refractive index 1.5, then dn1 is 0.5 (=1.5−1.0), and the material of layer 1221 may be chosen so that dn2 is close in magnitude to 0.5, e.g., a refractive index for layer 1221 of 1.2 yields dn2=0.3. In this example both the first and second refractive index differences are relatively large in magnitude, so that light extraction will be relatively strong in both regions 1250 and 1251, but stronger in region 1250 due to the larger first refractive index difference of e.g. an air/polymer interface. Nanovoided materials having an ultra low index (ULI) of refraction are known that can come somewhat close in index to air. See e.g. patent application publications WO 2010/120864 (Hao et al.) and WO 2011/088161 (Wolk et al.), which discuss ULI materials in a range from about n≈1.15 to n≈1.35. See also patent application publications WO 2010/120422 (Kolb et al.), WO 2010/120468 (Kolb et al.), WO 2012/054320 (Coggio et al.), and US 2010/0208349 (Beer et al.). In still other embodiments, dn2 may be chosen to be substantially equal in magnitude but different in sign to dn1 (or, if a large contrast is desired, different in sign and also substantially different in magnitude). The refractive index for layer 1221 may e.g. be 1.7 or more, or even about 2.0, whereupon dn1 and dn2 may both have magnitudes of about 0.5, but opposite signs. The patterned light transmissive layer 1221 may comprise any suitable material and may be made using any suitable manufacturing process. Transparent polymer materials, including in some cases adhesives including pressure sensitive adhesives, are preferred for ease of application, cost, and durability, but not non-polymeric materials, such as inorganic materials, may also be used. In some cases it may be desirable for the layer 1221 to have a high index of refraction, e.g., 1.6, 1.7, 1.8, 1.9, 2.0, 2.1, or higher, while in other cases a low index of refraction may be desired, e.g. 1.3, 1.2, or less for some ULI materials, while in still other cases an intermediate index of refraction, e.g. from about 1.4 to 1.5, may be desired. The patterned layer 1221 may be highly transmissive over the entire visible wavelength range, i.e., transparent and colorless, or it may be colored using suitable dye(s) and/or pigments so that transmission is high for some visible wavelengths but low for other visible wavelengths. Selecting a colorless material for patterned layer 1221 in FIG. 12 yields a pattern that is not readily apparent to a user or ordinary observer when the lighting device 1210 is turned off, i.e., when the light sources disposed to inject light into the light guide are turned off and little or no guided-mode light propagates within the light guide. Alternatively, the pattern or indicia can be made to be noticeable and apparent to users or observers when the lighting device 1210 is turned off by selecting a colored, e.g., pigmented and/or dyed, material for the patterned layer 1221.

The patterned light transmissive layer 1221 may be made using any suitable processes now known or later developed, including coating, printing, laminating, depositing, dissolving, and/or etching. The layer 1221 may be applied to the diffractive features 1213 in a selective manner, i.e., it may be applied to regions 1251 and not to regions 1250. Screen printing or ink-jet printing are two exemplary techniques for such selective application. The layer 1221 may alternatively be applied to the diffractive features 1213 in a spatially uniform layer, and then later dissolved, etched, or otherwise removed selectively from the regions 1250. Keeping in mind that any of the light guides discussed herein may have a layered construction, the patterned layer 1221 may be applied to a nanostructured major surface of a flexible polymer film, e.g. on a high volume film manufacturing line, and a piece of the coated film may later be laminated to a light transmissive plate or other substrate to produce a light guide with diffraction extraction features and patterned printing as disclosed herein.

FIG. 13 depicts a portion of a lighting device 1310 that may be the same as or similar to lighting device 1210, except that an additional layer 1321 is included such that the diffractive features 1213 in regions 1250 are no longer exposed to air, but instead are in optical contact with the additional layer 1321. Thus, the diffractive surface features 1213 in regions 1251 are in optical contact with the patterned layer 1221, but the diffractive surface features 1213 in the remaining regions 1250 are in optical contact with the additional layer 1321. One advantage of this "buried" design over that of FIG. 12 is that all of the diffractive surface features 1213, rather than just some of them, may be protected from contamination or damage from dirt, dust, water, and other external influences. Another advantage of FIG. 13 is that from a design standpoint, if a small contrast in extracted light is desired between the regions 1250 and 1251 to produce a subtle or barely visible indicia when the lighting device 1210 is turned on, then it is easier to nearly match the first refractive index difference (between the refractive index of the additional layer 1321 and that of the diffractive features 1213) with the second refractive index difference (between the refractive index of the patterned layer 1221 and that of the diffractive features 1213). That is because it is typically not difficult to select a suitable material for the layer 1321 whose refractive index nearly matches the refractive index for the patterned layer 1221. However, if a large contrast in extracted light is desired between the regions 1250 and 1251, materials for layers 1221, 1321 may alternatively be chosen with very different refractive indices so that the first refractive index difference is much larger than, or much smaller than, the second refractive index difference.

The additional layer 1321 may comprise any suitable material and may be made using any suitable manufacturing process. Transparent polymer materials, including in some cases adhesives including pressure sensitive adhesives, are preferred for ease of application, cost, and durability, but not non-polymeric materials, such as inorganic materials, may also be used. In some cases it may be desirable for the layer 1321 to have a high index of refraction, e.g., 1.6, 1.7, or higher, while in other cases a low index of refraction may be desired, e.g. 1.3, 1.2, or less for some ULI materials, while in still other cases an intermediate index of refraction, e.g. from about 1.4 to 1.5, may be desired. The additional layer 1321 may be highly transmissive over the entire visible wavelength range, i.e., transparent and colorless, or it may be colored using suitable dye(s) and/or pigments so that transmission is high for some visible wavelengths but low for other visible wavelengths.

Numerous possible visual effects for the pattern defined by layer 1221 are possible by tailoring the refractive index relationships between the diffractive surface features 1213, the patterned layer 1221, and the additional layer 1321, which refractive index relationships are in turn controlled by appropriate materials selection for these elements. With regard to the visibility of the pattern when the lighting device 1310 is turned on, the pattern may be made: bright with high contrast, by providing strong extraction of guided-mode light in the regions 1251 and weak extraction in the regions 1250; bright with low contrast, by providing strong extraction in both regions 1250 and 1251; dim with high contrast, by providing weak extraction in the regions 1251 and strong extraction in the regions 1250; and dim with low contrast, by providing weak extraction in both regions 1250 and 1251. Furthermore, the visibility of the pattern when the lighting device 1310 is turned off can also be tailored as desired by appropriate selection of the color (transmission over the visible wavelength range) of the patterned layer 1221 and the additional layer 1321. If both materials are composed of clear transparent materials, or even materials that are both colored but of approximately the same color, then the pattern may have a low visibility when the lighting device 1310 is turned off. The visibility of the pattern can be increased by selecting materials for the layers 1221, 1321 that have substantially different visible light transmission spectra, i.e., substantially different colors.

Similar to the patterned light transmissive layer 1221, the additional layer 1321 may be made using any suitable processes now known or later developed. Typically, the layer 1321 may simply be coated atop the exposed surface of pattern-printed diffractive surface features. If the light guide 1212 has a layered construction, the additional layer 1321 (as well as the patterned layer 1221) may be applied to a nanostructured major surface of a flexible polymer film, e.g. on a high volume film manufacturing line, and a piece of the coated film may later be laminated to a light transmissive plate or other substrate to produce a light guide with diffraction extraction features and patterned printing as disclosed herein.

The patterned layer 1221 may be composed of only one printed material, e.g. a particular single ink, or it may comprise multiple inks or similar patterned materials that may be printed or selectively coated as desired, e.g. in overlapping or non-overlapping patterns, and in a single layer or in multiple individual layers. For example, portions 1221a and 1221b may be composed of a first ink of a first color or refractive index, and portion 1221c may be composed of a second ink of a different color or refractive index. Alternatively, portions 1221a, 1221b, and 1221c may be composed of respective first, second, and third inks of differing colors and/or refractive indices. These principles can be extended to any desired number of inks or patterned materials without limit.

In the discussion above we say that the printed materials or inks have refractive indices that differ from that of each other and from that of the diffractive surface features or prisms. In some cases, the refractive index of these various layers may be less significant, or may be of no significance (e.g. the refractive index of the various layers may either be different or the same), while other material properties may instead be significant. The other material properties may for example be an absorptive characteristic, e.g., one material may have substantially no absorption over visible wavelengths, for a transparent and clear appearance, while another material (such as one of the printed inks) may selectively absorb certain visible wavelengths or colors, for a colored appearance of a first non-white color, and still another material (such as a different one of the printed inks) may selectively absorb other visible wavelengths or colors, for a colored appearance of a second non-white color. Absorption characteristics may also be outside the visible spectrum, e.g., printed materials or inks that absorb at ultraviolet and/or infrared (including near-infrared) wavelengths, with or without absorption in the visible region, may be used, e.g. in security applications. The other material properties may alternatively be a fluorescent characteristic, e.g., one material may emit no fluorescence or phosphorescence when exposed to short wavelength electromagnetic radiation (such as blue, violet, or ultraviolet light), while another material (such as one of the printed inks) may emit fluorescence or phosphorescence of a first color when exposed to the short wavelength radiation, and still another material (such as a different one of the printed inks) may emit fluorescence or phosphorescence of a second color when exposed to the short wavelength radiation. The fluorescent materials may be or comprise fluorescent dyes, phosphors, quantum dots, and the like.

Furthermore, in some cases a micro-spatial dot density can be used as a design parameter that can substitute for, or enhance, refractive index. For example, a material having a given intrinsic refractive index can be printed in a micro-spatial pattern or array of dots, analogous to gray scale newspaper printing, in order to provide a brightness of extracted light that corresponds to that of a non-micro-patterned layer of a lower refractive index. The individual dots in the array are typically smaller than can be discerned by an ordinary user, e.g. from about 2 to about 200 micrometers in diameter in plan view. The areal density of the dots determines the brightness in the printed region, and can be used to define an effective refractive index, where an areal density of 100% (dots merged together to form a non-micro-patterned layer) corresponds to the intrinsic refractive index of the material, and an areal density of 0% (dots so sparse that none exist) corresponds to the refractive index of air or other surrounding material. Micro-patterned dot arrays can for example be used to replace one or more of portions 1221*a*, 1221*b*, and 1221*c* in FIG. 13.

To reiterate, the image or pattern produced by the patterned light-transmissive layer may be made up of micro-spatial dots. The micro-spatial dots may be provided in an array of sizes and/or densities that are obtained by an analysis or breakdown of a pre-existing solid image.

Figure 14:
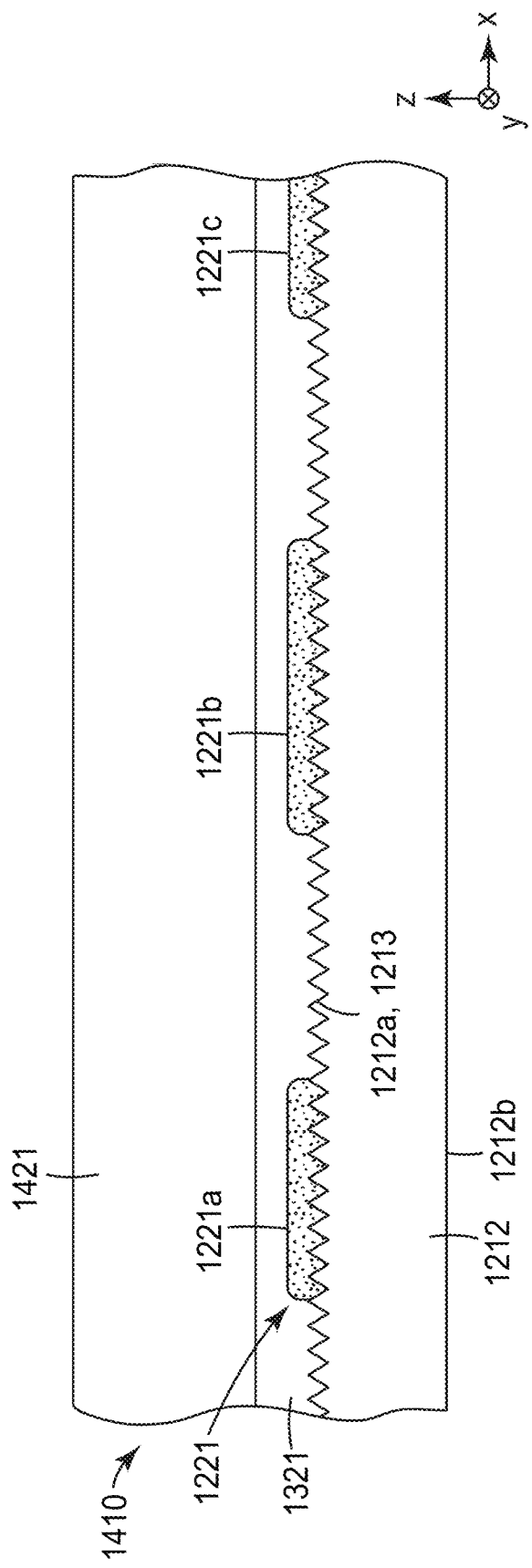

FIG. 14 depicts a portion of a lighting device 1410 that may be the same as or similar to lighting device 1310, except that another layer 1421 is included. The layer 1421 may be a carrier film for the layers 1221, 1321. Alternatively or in addition, the layer 1421 may be a protective layer such as a hard coat and may provide antiglare and/or anti-fingerprint layers, coatings, or elements as well. The layer 1421 may be thin or thick, flexible or rigid, and may be made of suitable light transmissive materials such as polymers or glasses.

Figure 15:
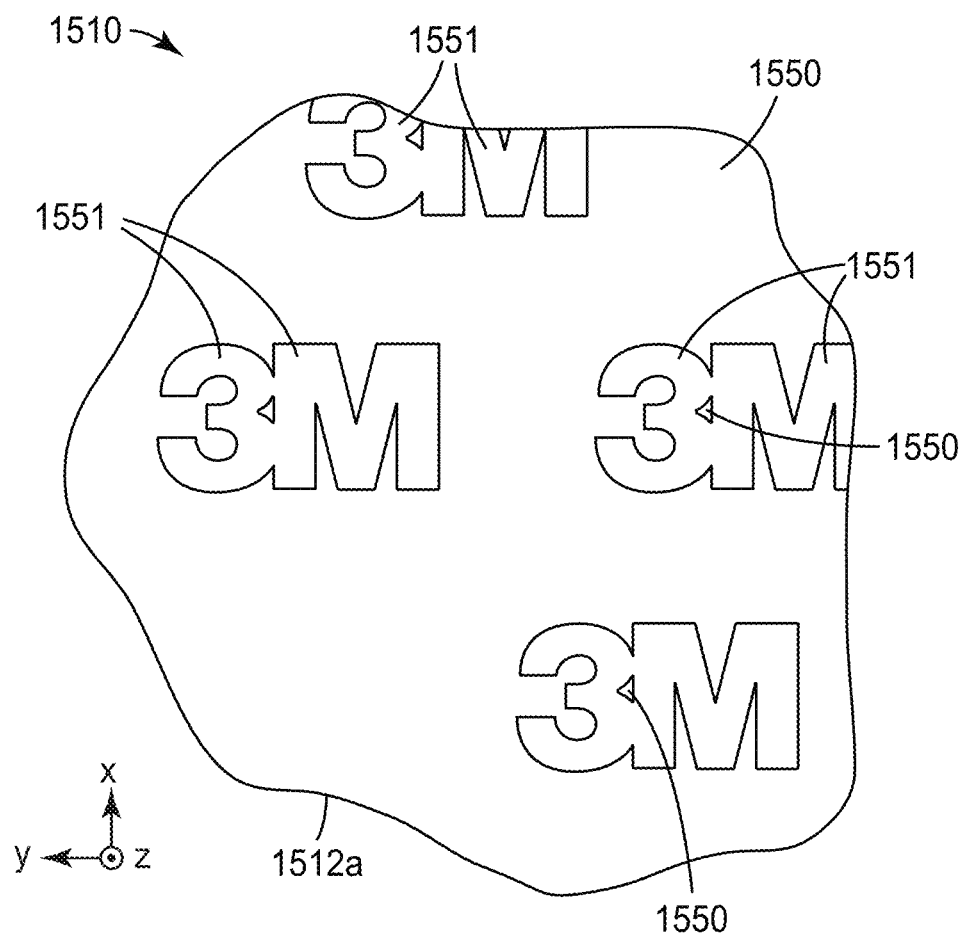
FIG. 15 is a schematic front or plan view of an embodiment in which the patterned printing forms indicia in the shape of logos.

The pattern provided by the patterned layer such as layer 1221 may be of any desired shape, size, or configuration, as permitted by the printing technique used and the size of the output area of the light guide. The pattern may be regular, irregular, random, or semi-random. The pattern may be large enough to be easily discernible to users of the lighting device, or so small that it, or individual elements of it, are not discernible to such users. The pattern may form indicia, e.g., alphanumeric characters, symbols, shapes, marks, or the like. In some cases, the pattern may be or comprise a group or corporate logo. Such a case is shown in FIG. 15. In that figure, a schematic plan view is shown of a portion of a lighting device 1510 having a light guide with a major surface 1512*a*. Diffractive surface features are provided over all of the major surface 1512*a* shown in the figure, but the diffractive surface features are not shown in the figure to reduce visual clutter. The diffractive surface features and light guide may be the same as or similar to any of the diffractive surface features or light guides discussed herein. A patterned light transmissive layer, which may be the same as or similar to layer 1221 described above, is present on the major surface 1512*a*, and in optical contact with the diffractive surface features in the regions 1551, but not in the regions 1550. The regions 1551 are in the form of indicia or logos. The size of the individual logos may be large enough to be easily discernible to users of the lighting device, or so small that they are not discernible to such users.

The disclosed lighting devices, which generally include an extended light guide and diffractive surface features disposed on at least one major surface of the light guide to extract guided-mode light, may also be made to include other design elements that work synergistically with the diffractive surface features. One such design element is a patterned low index subsurface layer within the light guide. The patterned subsurface layer may be patterned in a way that is the same as, similar to, or different from the patterning of the patterned layer discussed above, which is in optical contact with the diffractive surface features. But unlike the patterned layer discussed above, the subsurface layer is disposed beneath (although typically close to) the major surface of the light guide containing the diffractive surface features. The subsurface layer is thus disposed in an interior of the light guide between the opposed major surfaces thereof, and the light guide has a non-unitary construction. The subsurface layer functions to selectively block some guided mode light from reaching the diffractive surface features. This is accomplished by tailoring the subsurface layer to have first layer portions characterized by a lower refractive index than the bulk of the light guide, such that some of the guided mode light propagating in the bulk of the light guide is reflected by total internal reflection (TIR) at the first portions and prevented from reaching the diffractive surface features. The first layer portions reside in first regions of the light guide but not second regions thereof, the first and second regions being coplanar and in some cases complementary. The first and second regions may define a pattern that is regular, irregular, random, semi-random, or of any desired design.

In some cases, the subsurface layer is partially continuous with respect to the first and second regions. For example, a nanovoided polymeric material may be present in the first layer portions (in the first regions), and the subsurface layer may also include second layer portions in which the same nanovoided polymeric material is also present, the second layer portions residing in the second regions. The nanovoided polymeric material may then extend continuously from any given first layer portion to any and all second layer portions that are adjacent to such first layer portion. The nanovoided polymeric material may provide the first portions of the subsurface layer with a refractive index that is substantially lower than the bulk of the light guide. For example, the refractive index of the first portions at visible wavelengths may be less than 1.4, or less than 1.3, or less than 1.2. The nanovoided polymeric material may have a void volume in a range from about 10 to about 60%, or from about 20 to about 60%, or from about 30 to about 60%, or from about 40 to about 60%. The second layer portions of the subsurface layer may be composed of the nanovoided polymeric material and an additional material.

The additional material may occupy at least a portion of the void volume (and in some cases may substantially completely fill the interconnected nanovoids such that little or no void volume remains), and preferably has the effect of changing the refractive index of the second layer portions by at least about 0.03, e.g., from about 0.03 to about 0.5, from about 0.05 to about 0.5, or from about 0.05 to about 0.25, relative to the first layer portions in which the additional material is not substantially present. In some cases the additional material may be the same material as a binder used to form the nanovoided polymeric material. Further information regarding suitable subsurface layers having the continuous nanovoided polymeric material construction can be found in the following commonly assigned U.S. patent applications, in which the subsurface layer is referred to as a variable index light extraction layer: U.S. application Ser. No. 61/446,740, "Front-Lit Reflective Display Device and Method of Front-Lighting Reflective Display", filed Feb. 25, 2011; U.S. application Ser. No. 61/446,642, "Variable Index Light Extraction Layer and Method of Illuminating With Same", filed Feb. 25, 2011; U.S. application Ser. No. 61/446,712, "Illumination Article and Device for Front-Lighting Reflective Scattering Element", filed Feb. 25, 2011; and U.S. application Ser. No. 61/485,881, "Back-Lit Transmissive Display Having Variable Index Light Extraction Layer", filed May 13, 2011.

In some cases, the subsurface layer is discontinuous with respect to the first and second regions. For example, the first layer portions (in the first regions) may be printed with a first material of relatively low refractive index, and the second regions may be filled with a second material of relatively high refractive index, e.g., having a refractive index substantially matching, or exceeding, that of the bulk of the light guide. Here, unlike the partially continuous subsurface layer described above, the second material in the second regions may have no common structure or composition relative to the first material in the first regions, and the subsurface layer may consist essentially of the first layer portions.

Figure 17:
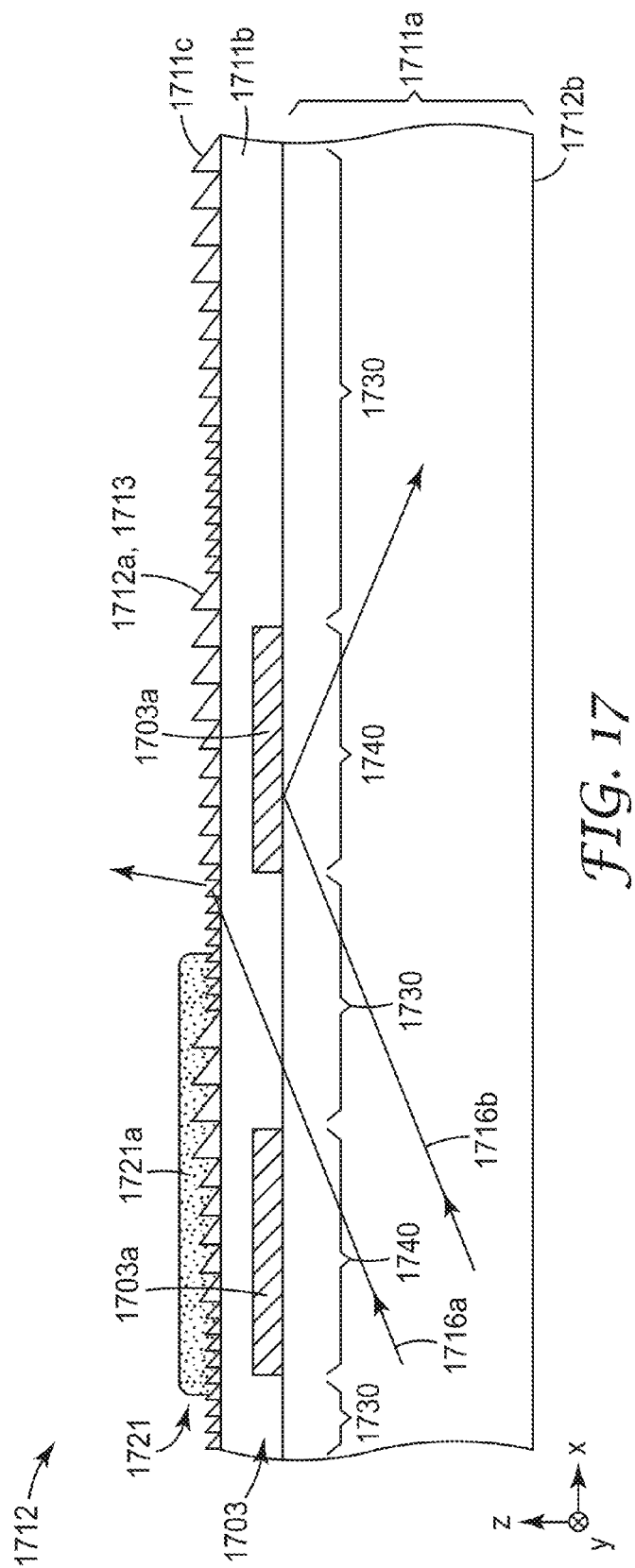

Exemplary embodiments that incorporate such subsurface layers are shown schematically in FIGS. 16 and 17. In FIG. 16, a light guide 1612 includes opposed first and second major surfaces 1612a, 1612b, and diffractive surface features 1613 are formed on the first major surface 1612. A patterned light transmissive layer 1621, comprising at least portion 1621a, is provided atop the major surface 1612a. The light guide 1612, diffractive surface features 1613, and patterned layer 1621 may be the same as or similar to corresponding elements described elsewhere herein. The diffractive surface features 1613 may be provided by a microreplicated optical film 1611c having a prism layer cast and cured on a carrier film. A major portion or bulk of the light guide 1612 may be provided by a plate or other relatively thick substrate 1611a, to which the microreplicated optical film 1611c is attached indirectly through a subsurface film 1611b. In the embodiment of FIG. 16, the subsurface film 1611b includes a carrier film on which is disposed a patterned low index subsurface layer 1603. The subsurface layer 1603 comprises first layer portions 1603a in first regions 1640, and second layer portions 1603b in second regions 1630. Adhesive layers (not shown) may also be provided between the microreplicated optical film 1611c and the subsurface film 1611b, and between the subsurface film 1611b and the substrate 1611a, for reliable and robust attachment with no significant air gaps. Such adhesive layers, and the second layer portions 1603b, and the carrier films, and the prism layer all preferably have relatively high refractive indices that match, substantially match, or exceed the refractive index of the substrate 1611a, such that these components support the propagation of guided-mode light along the light guide 1612 between the surfaces 1612a, 1612b.

The first layer portions 1603a of the subsurface layer 1603 comprise a suitable nanovoided polymeric material having a first refractive index that is substantially lower than that of the other components of the light guide 1612. The nanovoided polymeric material may be or comprise any of the ultra low index (ULI) materials discussed elsewhere herein. Preferably, substantially all of each first layer portion 1603a includes the nanovoided polymeric material. Further, the index of refraction is preferably relatively spatially uniform within each first layer portion 1603a, e.g., the refractive index may change by no more than ±0.02 across a continuous transverse plane for each layer portion. The refractive index of the first portions 1603a may be less than 1.4, or less than 1.3, or less than 1.2. The nanovoided polymeric material may have a void volume in a range from about 10 to about 60%, or from about 20 to about 60%, or from about 30 to about 60%, or from about 40 to about 60%.

The second layer portions 1603b in the second regions 1630 comprise the same nanovoided polymeric material used in the first layer portions 1603a, but the second portions 1603b also include an additional material. The additional material, which may permeate some or substantially all of the void volume of the nanovoided material, causes the second portions 1603b to have a second refractive index that is different from the first refractive index by at least about 0.03, e.g., from about 0.03 to about 0.5, from about 0.05 to about 0.5, or from about 0.05 to about 0.25. The index of refraction is preferably relatively spatially uniform within each second layer portion 1603b, e.g., the refractive index may change by no more than ±0.02 across a continuous transverse plane for each layer portion.

As a result of the lower refractive index in the first regions 1640, guided-mode light (sometimes also referred to as supercritical light) that encounters the first layer portions 1603a is reflected by TIR back towards the major surface 1612b before it reaches the major surface 1612a with the diffractive surface features 1613. That is, the first layer portions 1603a deflect or block some of the guided-mode light from reaching and interacting with the diffractive surface features in the first regions 1640. This is depicted in FIG. 16 by guided-mode light ray 1616b. On the other hand, the substantial matching (or exceeding) of the refractive index of the second layer portions 1603b with those of the polymers, carrier films, and substrate 1611a, causes guided-mode light that encounters the second layer portions 1603b to continue propagating substantially undisturbed to the first major surface 1612a, where at least some of the light is extracted or out-coupled into the surrounding medium, as described in detail above, by the diffractive surface features 1613. This is depicted in FIG. 16 by guided-mode light ray 1616a. The subsurface layer 1603 thus selectively, in a pattern-wise fashion, deflects some of the guided-mode light within the light guide 1612 so that it does not interact with the diffractive surface features 1613.

FIG. 16*a* shows a schematic cross section of an exemplary embodiment of the patterned low index subsurface layer 1603. The layer 1603 includes first layer portions in first regions 1640, the layer portions in both such regions comprising a nanovoided polymeric material. In some embodiments, the nanovoided polymeric material comprises a plurality of interconnected nanovoids as described for example in WO 2010/120422 (Kolb et al.) and WO 2010/120468 (Kolb et al.). The plurality of interconnected nanovoids is a network of nanovoids dispersed in a binder wherein at least some of the nanovoids are connected to one another via hollow tunnels or hollow tunnel-like passages. The nanovoids or pores in such nanovoided polymeric material can extend to one or more surfaces of the material.

The subsurface layer 1603 also includes a second layer portion in a second region 1630 disposed between first regions 1640. The second region comprises the nanovoided polymeric material and an additional material. This additional material may occupy at least a portion of the void volume of the nanovoided polymeric material. The dashed lines in FIG. 16*a* are used to indicate general location of the first and second regions, however, these dashed lines are not meant to describe any sort of boundary between the regions.

In some embodiments, a seal layer is disposed on the patterned low index subsurface layer in order to minimize penetration of contaminants into the latter. For example, a seal layer may be disposed on the patterned low index subsurface layer such that it is in between the patterned low index subsurface layer and an adhesive layer. For another example, a seal layer may be disposed on the patterned low index subsurface layer such that it is in between the patterned low index subsurface layer and the substrate or other constituent layer of the lightguide, and the seal layer may have a refractive index that is approximately equal to or greater than that of the substrate or other layer. Suitable seal layers are discussed in the commonly assigned U.S. patent applications cited above.

In FIG. 17, a light guide 1712 includes opposed first and second major surfaces 1712*a*, 1712*b*, and diffractive surface features 1713 are formed on the first major surface 1712. A patterned light transmissive layer 1721, comprising at least portion 1721*a*, is provided atop the major surface 1712*a*. The light guide 1712, diffractive surface features 1713, and patterned layer 1721 may be the same as or similar to corresponding elements described elsewhere herein. The diffractive surface features 1713 may be provided by a prism layer 1711*c* which is cast-and-cured, microreplicated, embossed, etched, or otherwise formed on a high index resin layer 1711*b*. The resin layer 1711*b* may in turn be applied to a plate or other relatively thick substrate 1711*a*, which may comprise a major portion or bulk of the light guide 1712. However, before the resin layer 1711*b* is applied to the substrate 1711*a* and cured, a patterned low index subsurface layer 1703 is pattern-wise applied to the substrate 1711*a*. The subsurface layer 1703 comprises first layer portions 1703*a* in first regions 1740, but the subsurface layer 1703 is either not applied to, or is applied to and later removed from, the substrate 1711*a* in second regions 1730. Thus, at the time of application of the resin layer 1711*b*, the resin layer fills in the spaces in the second regions 1730. If desired, adhesive layers (not shown) and carrier films (not shown) may also be included in the construction, depending on the details of manufacture. Any such adhesive layers and carrier films, as well as the resin layer 1711*b* and the prism layer 1711*c*, all preferably have relatively high refractive indices that match, substantially match, or exceed the refractive index of the substrate 1711*a*, such that these components support the propagation of guided-mode light along the light guide 1712 between the surfaces 1712*a*, 1712*b*.

The first layer portions 1703*a* of the subsurface layer 1703 are composed of a low index material having a first refractive index that is substantially lower than that of the other components of the light guide 1712. In some cases, the low index material may be or comprise a nanovoided material such as those discussed in connection with FIGS. 16 and 16*a*, e.g., a ULI material. In other cases, the low index material may be an optical material that is not nanovoided, e.g., a UV curable resin comprising at least one fluorinated monomer, at least one fluorinated oligomer, at least one fluorinated polymer, or any combination of such fluorinated materials. Preferably, the refractive index of the first portions 1703*a* is less than 1.47, or less than 1.43, or less than 1.4, or less than 1.3, or less than 1.2.

The high index resin layer 1711*b* may be composed of any suitable polymer or other light-transmissive material having a suitably high refractive index so that a substantial amount of guided-mode light can propagate from the substrate 1711*a* to the prism layer 1711*c*.

As a result of the lower refractive index in the first regions 1740, guided-mode or supercritical light that encounters the first layer portions 1703*a* is reflected by TIR back towards the major surface 1712*b* before it reaches the major surface 1712*a* with the diffractive surface features 1713. That is, the first layer portions 1703*a* block some of the guided-mode light from reaching and interacting with the diffractive surface features in the first regions 1740. This is depicted in FIG. 17 by guided-mode light ray 1716*b*. On the other hand, the substantial matching (or exceeding) of the refractive index of the resin layer 1711*b* with those of the polymers, carrier films, and substrate 1711*a*, causes guided-mode light that encounters the second regions 1730 to continue propagating substantially undisturbed to the first major surface 1712*a*, where at least some of the light is extracted or out-coupled into the surrounding medium, as described in detail above, by the diffractive surface features 1713. This is depicted in FIG. 17 by guided-mode light ray 1716*a*.

The pattern provided by the patterned low index subsurface layer (e.g., layers 1603, 1703) may be closely related, loosely related, or not related at all to the pattern provided by the patterned light transmissive layer (e.g., layer 1221 in FIGS. 12-14). In some cases, the subsurface pattern may be a gradient pattern designed to deliver uniform light or luminance to the diffractive surface features on the major surface of the light guide. In such cases, the printed pattern on the diffractive surface features can be any desired shape or image, and no registration of any kind between the two patterns is needed. Typically, the two patterns would at least partially overlap in such cases. In other cases, the subsurface pattern may be in the form of a specific image (e.g. indicia), whether a solid image print or dithered print in the shape of an image. In these cases, the printed pattern on the diffractive surface features may be registered with the subsurface pattern, but such registration is not required. For example, in some cases, for aesthetic or artistic purposes, distinctly different images with no particular alignment or registration can be provided by the two patterns. Such patterns, which would typically be at least partially overlapping, can be used to create interesting levels of contrast in the illumination scheme to provide a unique appearance for the lighting device. However, in some cases, alignment or registration of the two patterns can be used to amplify the visual effect or contrast of foreground and background areas of the patterns, e.g., by selectively delivering more light to printed areas of the diffractive surface features and blocking light from reaching non-printed areas of the diffractive surface features, or vice versa. In that regard, the patterns can be made to be spatially complementary, and registered to each other such that the subsurface pattern delivers light substantially only to non-printed regions of the diffractive surface features, which may also result in a contrast enhancement of the image. In still other cases, the two patterns may be the same or similar to each other, but offset in registration by a controlled amount to provide a shadowing effect, such as the shadowing effect used for displayed text commonly used in computer presentation software.

In addition to being useful as luminaires for illuminating work spaces, living areas, and the like, the lighting devices disclosed herein may alternatively be useful as illuminated security features, wherein the pattern(s) provided by the printed layer(s) provide indicia that may be covert and/or overt in nature as desired. In some security applications, the device may be incorporated into or applied to a product, package, or document, e.g. as an indicator of authenticity since the visual features are difficult to copy or counterfeit. Such security applications may include: cards of various types including identification cards, social security cards, health cards, insurance cards, business cards, membership cards, voter registration cards, phone cards, stored value cards, gift cards, border crossing cards, immigration cards, and financial transaction cards (including credit cards and debit cards); badges; passports; drivers licenses; vehicle license plates; gun permits and other permits; event passes; advertising promotions; product tags including hang-tags; product packaging; labels; charts; maps; and other security articles and documents.

In some cases, such as in a card, one or more miniature light sources such as LEDs may be included in the construction at or near an edge of the card to provide the guided-mode light. In other cases, such as in the case of a passport or other security document, but also in the case of cards, light sources may not be included in the article itself, but the article may be configured for use with a reader or similar testing device that contains one or more suitable light sources adapted to couple to an edge (or other surface) of the card or document to inject light into the light-transmissive layer or layers that make up the light guide, or the article may be configured for use with natural light sources. The light guide may be relatively thick and rigid, as in the case of a clear light-transmissive financial transaction card, or relatively thinner and flexible, as in the case of a polymer sheet for use in a passport, for example.

EXAMPLE 1

A lighting device suitable for use as a luminaire was made and evaluated. The device incorporated a circular-shaped light guide with diffractive surface features in the form of a spiral pattern, the diffractive surface features arranged into repeating patterns of six packet types with different groove or prism pitches. A mounting ring was used to position thirty-six equally spaced LEDs around the curved side surface of the light guide to inject light into the light guide. Indicia in the shape of a United States map was formed by patterned printing on the diffractive surface features. Further details of construction will now be given.

A precision diamond turning machine was used to cut a spiral-shaped groove pattern, which became the diffractive surface features in the lighting device after replication, into the copper surface of a cylindrical tool. The diamond was shaped so that the grooves had a sawtooth (asymmetric) profile in cross section similar to FIG. 6, with a height-to-pitch ratio (see FIG. 6) of about 1:1. During cutting, the groove pitch of the spiral was cycled between six specific values (315 nm, 345 nm, 375 nm, 410 nm, 445 nm, and 485 nm) to produce groove packets which formed nested annular regions that bordered each other but did not overlap with each other. Each annular region was a groove packet of constant pitch, and each set of six adjacent annular regions formed a repeating group or set of groove packets. The spiral pattern had an overall diameter of about 8 inches (about 20 centimeters). The radial dimensions or widths of the annular regions were selected so that the aggregate area for all of the six pitch values was the same. That is, the area of the entire grooved pattern was about 314 cm$^2$ ($\pi r^2$, where r≈10 cm), and the aggregate area for grooves having the 315 nm pitch was about 314/6≈52 cm$^2$, and the aggregate areas for grooves having each of the other five pitches was also about 52 cm$^2$. The annular regions were relatively narrow as measured radially, the maximum such dimension being about 150 micrometers.

The grooved surface of the resulting copper tool was then replicated in a thin flexible light-transmissive film (see e.g. layers 1111b and 1111c in FIG. 11) using a cast-and-cure technique. This was done by coating the grooved surface of the copper tool with an organic phosphonic acid release layer (commonly known to those skilled in the art), and casting an acrylate resin composition against the coated precision tool using a transparent polyethylene terephthalate (PET) support film having a thickness of about 5 mils (about 125 micrometers). The acrylate resin composition included acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). The resin composition was then cured using ultraviolet light. This resulted in a microreplicated optical film about 125 microns thick and having diffractive surface features in the form of a negative or inverted version (negative replica) of the spiral-shaped groove pattern from the precision copper tool. The refractive index of the PET support film was about 1.49 and the refractive index of the cured acrylate resin was about 1.5. The microreplicated optical film had a transparent appearance when viewed at an angle normal to the surface of the film, with a slightly blue hue. Objects could be viewed through the film with low distortion.

The microreplicated film was then pattern printed in the shape of a United States map. This was done by first obtaining a sheet of lined optically clear pressure sensitive adhesive (PSA), sold as Vikuiti™ OCA 8171 by 3M Company. This product is sold as a 1 mil (about 25 micrometer) thick PSA layer sandwiched between two 2 mil (50 micrometer) thick release liners. Ordinarily, when the product is used to bond two articles together, the release liners are removed and discarded, so that only the 1 mil thick PSA layer is present between the bonded articles. In the present case, we removed a first one of the release liners from the sheet, and pressed the exposed adhesive layer (still attached on the other side to the original second release liner) against a 2 mil (50 micrometer) PET film. We then removed the second release liner, thus exposing the other surface of the PSA layer. A UV-curable clear ink (product code UV OP1005 GP Varnish, available from Nazdar Company, Shawnee, Kans.) was then printed onto the exposed surface of the PSA layer using an indirect gravure printing process. Printing was done using a flexographic tool having a pattern of a United States map. The line speed during printing was about 10 meters/minute using an anilox roll, the anilox roll having an approximate volume of 5 billion cubic microns/square inch, and rated to give a wet coating thickness of about 4 microns. After printing, some portions of the formerly exposed surface of the PSA layer were coated with the ink, and remaining portions were left uncoated and exposed to the air. The uncoated portions corresponded to foreground areas of the map image, and the coated portions corresponded to the background areas of the map image. The ink was then cured (cross-linked) using ultraviolet light from a mercury vapor lamp ("H" bulb) to form a clear, non-adhesive amorphous glass-like layer, approximately 4 microns thick, on selected portions of the surface of the PSA layer corresponding to the background areas of the map image.

The resulting printed sheet was then pressed against the surface of the microreplicated optical film containing the diffractive surface features to form a patterned laminate. Portions of the PSA layer that were not coated with the cured ink, corresponding to the background areas of the map image, flowed into and filled the spaces between the diffractive surface features, so that optical contact was made between the PSA layer, which had a refractive index of about 1.475, and the diffractive surface features, which had a refractive index of about 1.5. Portions of the PSA layer that were coated with the cured ink, corresponding to the foreground areas of the map image, did not flow into or make optical contact with the diffractive surface features due to the presence of the glass-like cured ink. In those areas, a very thin air pocket or layer remained between the cured ink and the diffractive surface features such that the diffractive surface features were in optical contact with air.

Excess material around the spiral diffractive feature area was cut away so that the patterned laminate was circular in shape. The patterned laminate was directly attached to one major surface of a clear, light-transmissive circular acrylic plate of thickness 3 mm, the plate also having a diameter of about 20 cm. Attachment was carried out such that the 2 mil PET support film of the printed adhesive became the outermost layer of the construction, with the diffractive surface features (some in optical contact with the optically clear PSA, others in optical contact with the thin air layer) disposed between the PET support film and the plate. The combination of the plate and the patterned laminate resulted in a light guide with diffractive surface features on (only) one major surface thereof for light extraction, and with patterned printing forming indicia (a United States map image), the light guide having a diameter of about 20 cm and a thickness of about 3 mm.

A string of 36 nominally identical LEDs (product code NCSL119T-H1 from Nichia), each LED emitting white light ("warm white") in a divergent distribution, was used for light injection into the light guide. The LEDs were mounted in a ring-shaped bezel so that they were equally spaced in 10 degree increments around the circular side surface of the light guide, each LED pointed towards the center of the light guide and disposed immediately adjacent the side surface to directly inject light into the light guide. For improved efficiency, strips of high reflectivity mirror film (3M™ Vikuiti™ ESR) were laminated on the inside surface of the mounting ring between every two neighboring LEDs, the mirror film strips also being immediately adjacent the circular side surface of the light guide.

Figure 18A:
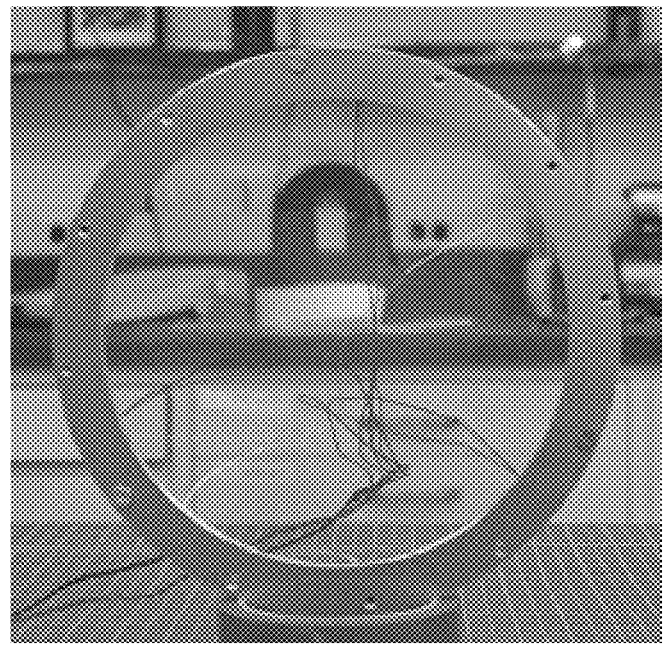
FIG. 18a is a photograph of a lighting device that was constructed using a circular light guide having curved diffractive surface features and patterned printing in the shape of a United States map in contact with diffractive surface features, the lighting device photographed approximately along an optical axis of the device and with ambient light on and the discrete light sources of the lighting device turned off.
Figure 18B:
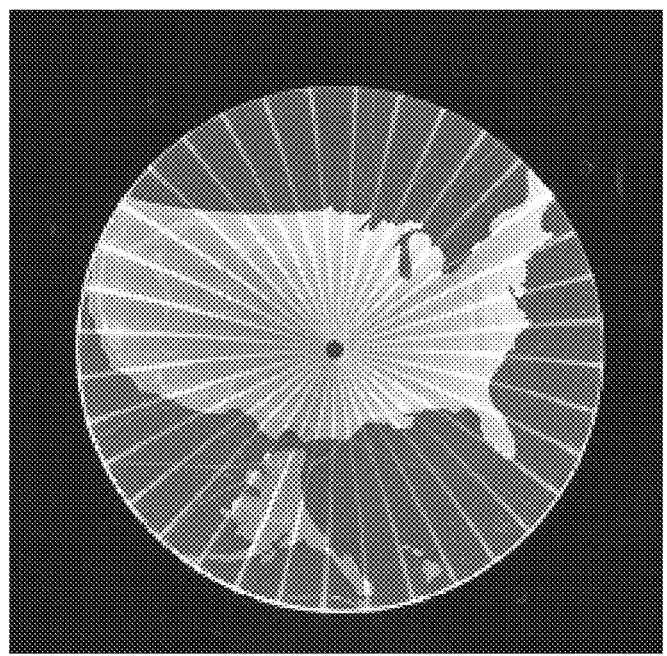
Figure 18C:
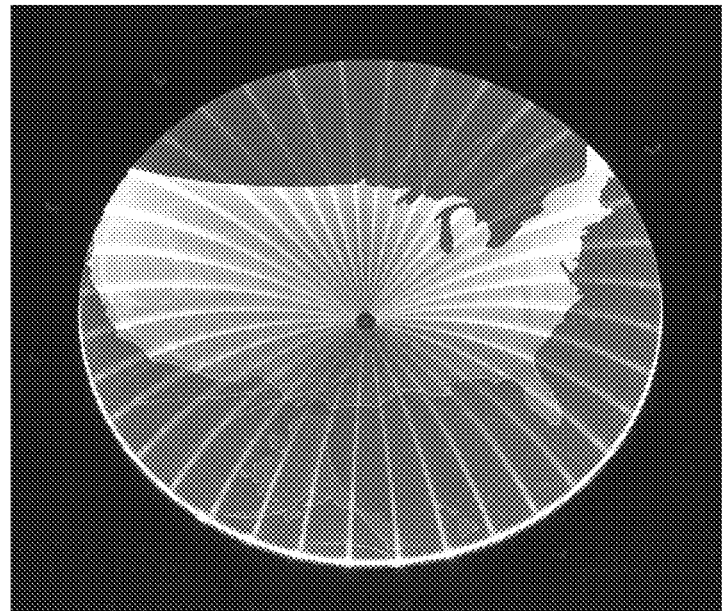
FIG. 18c is a photograph of the lighting device of FIGS. 18a and 18b, but at a more oblique viewing angle and from an opposite side of the lighting device.

The lighting device so constructed was connected to a power supply and placed sideways on a table in a laboratory setting, with the symmetry or optical axis of the light guide parallel to the floor. FIG. 18a is a photograph of the lighting device with the power supply turned off and ambient room lights turned on. The viewing direction for this photograph was approximately head-on, i.e., along the optical axis of the light guide. Note that objects across the room can be seen through the light guide with little or no significant distortion. Wires used to connect the lighting device to the power supply can also be seen through the light guide. In this "off" state, the light guide had a slightly bluish hue similar to that of the microreplicated film by itself. FIG. 18b is a photograph of the same lighting device from the same viewing direction as FIG. 18a, but with the power supply (and thus all 36 LEDs) turned on and the ambient room lights turned off. The U.S. map of the patterned printing is clearly visible, and the contrast between printed regions and remaining regions is high. Variable color hues could also be seen at different areas of the light guide, the colors not being visible in the grayscale photograph of FIG. 18b. Bright bands can also be seen over the output area of the light guide, superimposed on the printed pattern, one band for each of the 36 energized light sources, and these bands are plainly visible in FIG. 18b. The bands are all relatively straight (radial) with little or no curvature from the viewing geometry of FIG. 18b. When observed at other viewing directions, the printed pattern changed appearance in the same way that any flat, 2-dimensional image changes appearance from different perspectives. In contrast, the bands changed appearance as if they formed a 3-dimensional structure with each band being a curved arch lying in a radial plane perpendicular to the plane of the light guide. Thus, at oblique viewing angles, some of the bands changed in apparent shape from straight to curved. This can be seen in FIG. 18c, which is a photograph of the same lighting device but at an oblique viewing angle, and taken from the opposite side of the lighting device. Variable color hues could also be seen across the light guide at virtually any viewing direction.

EXAMPLE 2

Another lighting device suitable for use as a luminaire was made and evaluated. The device incorporated a circular-shaped light guide with diffractive surface features. The diffractive surface features filled 36 triangle-shaped areas which were uniformly sized and tiled to substantially fill the circular area of the light guide. The diffractive surface features in each of the triangle-shaped areas were straight and parallel to each other, and of a single pitch, although three different triangle types of three different pitches were used. A mounting ring was used to position thirty-six equally spaced LEDs around the curved side surface of the light guide to inject light into the light guide. Indicia in the shape of a United States map was formed by patterned printing on the diffractive surface features. Further details of construction will now be given.

A precision diamond turning machine was used to cut linear grooves into the copper surface of a cylindrical tool. The diamond was shaped so that the grooves had a sawtooth (asymmetric) profile in cross section similar to FIG. 6, with a height-to-pitch ratio (see FIG. 6) of about 1:1. During cutting, the groove pitch was maintained at a constant value of about 310 nm to produce a first single-pitch one-dimensional diffraction grating tool. This procedure was then repeated in another copper surface using a different groove pitch, the pitch now being maintained at a constant value of about 345 nm to produce a second single-pitch one-dimensional diffractive grating tool. The procedure was repeated a third time in still another copper surface using a third groove pitch, the third pitch being maintained at a constant value of about 410 nm to produce a third single-pitch one-dimensional diffractive grating tool.

The grooved surfaces of the resulting three copper tools were then replicated in three corresponding thin flexible light-transmissive films (see e.g. layers 1111b and 1111c in FIG. 11) using a cast-and-cure technique. This was done by coating the grooved surface of each copper tool with an organic phosphonic acid release layer (commonly known to those skilled in the art), and casting an acrylate resin composition against the coated precision tool using a transparent polyethylene terephthalate (PET) support film having a thickness of about 5 mils (about 125 micrometers). The acrylate resin composition included acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). The resin composition was then cured using ultraviolet light. This resulted in three microreplicated optical films, each about 125 microns thick and having diffractive surface features in the form of negative or inverted versions (negative replicas) of the linear groove pattern from the first, second, and third precision copper tools, respectively. The refractive index of the PET support film was about 1.49 and the refractive index of the cured acrylate resin was about 1.5. Each of the microreplicated optical films had a transparent appearance when viewed at an angle normal to the surface of the film, with a slightly blue hue. Objects could be viewed through each film with low distortion.

The microreplicated optical films were then physically cut into triangle-shaped pieces, twelve such pieces obtained from each of the first, second, and third optical films. The pieces were substantially identically shaped into isosceles triangles with two long edges and one short edge, the long edges each being about 100 mm in length and the short edge being about 17 mm in length. The pieces were all cut from their respective optical films such that the diffractive surface features completely filled one major surface of the triangle piece, and the individual grooves or prisms of the diffractive surface features were all parallel to the short edge of the triangle shape.

All thirty-six of the triangle-shaped pieces of optical film were then directly attached to one major surface of a clear, light-transmissive circular acrylic plate of thickness 3 mm, the plate having a diameter of about 20 cm. For the attachment, the triangle-shaped pieces were laid next to each other in a tiled arrangement with the long edges of adjacent pieces abutting each other, and with the short edges of the pieces forming a thirty-six sided shape approximating a circle and substantially coinciding with the circular outer side surface of the acrylic plate. The film pieces were also arranged in a repeating sequential 1,2,3,1,2,3, . . . fashion such that any given piece from the first film abutted a piece from the second film along one long edge and abutted a piece from the third film along the other long edge. Attachment of the pieces to the plate was accomplished using a 1 mil (approximately 25 micrometer) thick optically clear pressure sensitive adhesive (Vikuiti™ OCA 8171 from 3M Company), with the microreplicated surface of each film piece facing away from the plate and exposed to air, and with substantially no air gaps between each film piece and the plate. The combination of the plate and the thirty-six film pieces resulted in a light guide with diffractive surface features on (only) one major surface thereof for light extraction, the light guide having a diameter of about 20 cm and a thickness of about 3 mm.

A sheet of lined optically clear pressure sensitive adhesive (PSA) was then obtained and printed with a curable ink in the pattern of a United States map substantially as described in Example 1. After the ink was cured, the resulting printed sheet was joined to the light guide by pressing the printed sheet against the surface of the microreplicated optical film pieces containing the diffractive surface features. Portions of the PSA layer that were not coated with the cured ink, corresponding to the background areas of the map image, flowed into and filled the spaces between the diffractive surface features, so that optical contact was made between the PSA layer, which had a refractive index of about 1.475, and the diffractive surface features, which had a refractive index of about 1.5. Portions of the PSA layer that were coated with the cured ink, corresponding to the foreground areas of the map image, did not flow into or make optical contact with the diffractive surface features due to the presence of the glass-like cured ink. In those areas, a very thin air pocket or layer remained between the cured ink and the diffractive surface features such that the diffractive surface features were in optical contact with air. The combination of the light guide (the plate and the optical film pieces) and the printed sheet resulted in a light guide with diffractive surface features on (only) one major surface thereof for light extraction, and with patterned printing forming indicia (a United States map image), the light guide having a diameter of about 20 cm and a thickness of about 3 mm.

A string of 36 nominally identical LEDs (product code NCSL119T-H1 from Nichia), each LED emitting white light ("warm white") in a divergent distribution, was used for light injection into the light guide. The LEDs were mounted in a ring-shaped bezel so that they were equally spaced in 10 degree increments around the circular side surface of the light guide, each LED pointed towards the center of the light guide and disposed immediately adjacent the side surface to directly inject light into the light guide. For improved efficiency, strips of high reflectivity mirror film (3M™ Vikuiti™ ESR) were laminated on the inside surface of the mounting ring between every two neighboring LEDs, the mirror film strips also being immediately adjacent to the circular side surface of the light guide.

Figure 19:
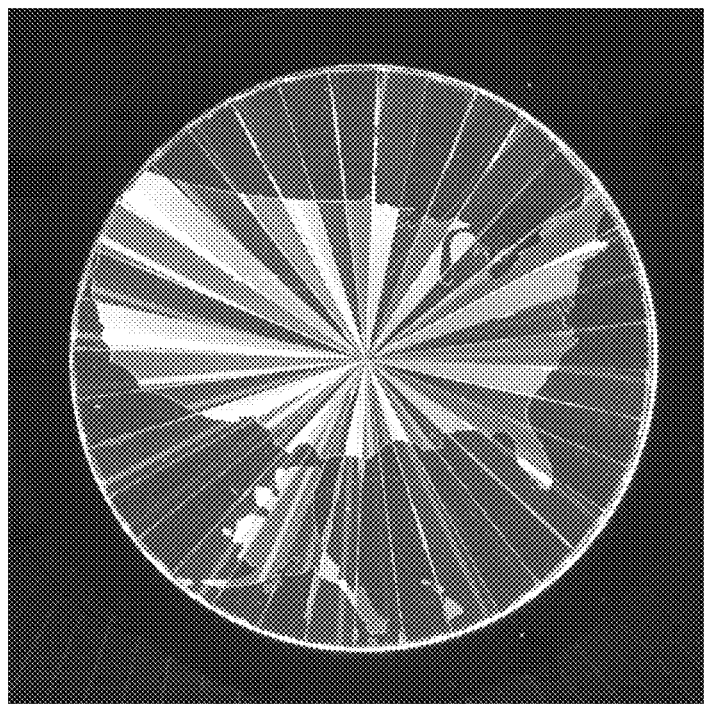

The lighting device so constructed was connected to a power supply and placed sideways on a table in a laboratory setting in the same way as in Example 1. With the power supply turned off and in ambient room light, objects across the room could be seen through the light guide with little or no significant distortion. Furthermore, in this "off" state, the light guide had a slightly bluish hue similar to that of the microreplicated film by itself, and the printed image of the U.S. map could not be easily perceived. FIG. 19 is a photograph of the lighting device of this Example 2 with the power supply (and thus all 36 LEDs) turned on and the ambient room lights turned off. The U.S. map of the patterned printing is clearly visible, and the contrast between printed regions and remaining regions is high. Variable color hues could also be seen at different areas of the light guide, with different triangle-shaped areas having different colors (particularly in the foreground areas of the map image) which are discernible in FIG. 19 even though the colors themselves are not visible due to the grayscale format of the photograph. Straight radial border features, which are relatively bright and caused by light scattering at the edges of the individual triangle-shaped pieces, can also be seen in the photograph. In addition to these bright border features, additional fainter radial bands can also be seen in some places over the output area of the light guide, superimposed on the printed pattern, these fainter bands being associated with particular ones of the energized light sources. The fainter bands are all relatively straight (radial) with little or no curvature from the viewing geometry of FIG. 19, but their shape changed as a function of viewing angle in a 3-dimensional fashion in the same way as the bright bands of Example 1 changed. Variable color hues could also be seen across the light guide at virtually any viewing direction.

EXAMPLE 3

Another lighting device suitable for use as a luminaire was made and evaluated. The device incorporated a rectangular-shaped light guide with diffractive surface features. The diffractive surface features were a portion of the spiral-shaped groove pattern described in Example 1, the portion taken from a central rectangular region of the spiral pattern. A light source module was mounted along one of the short edges of the rectangular light guide, the light source module containing one row of eighteen equally spaced individual, discrete light sources, the light sources being nominally identical LEDs each emitting white light in a divergent distribution. The light guide also incorporated a patterned low index subsurface layer in the form of a random gradient dot pattern. The light guide was also capable of incorporating patterned printing, such as the United States map indicia or other desired indicia, in contact with the diffractive surface features. Further details of construction will now be given.

The following ingredients were combined in a 1-liter wide-mouth amber bottle: 5.70 g of an aliphatic urethane oligomer (product code CN 9893 from Sartomer Company, Exton, Pa.), and 22.40 g of pentaerythritol triacrylate (product code SR 444, also from Sartomer Company). The bottle was capped and shaken for 2 hours to dissolve the CN9893 to produce a clear batch. This solution, referred to as a resin premix, was combined with 482.84 g of silane treated (product code Silquest™ A-174 from Momentive Performance Materials, Friendly, W. Va.) colloidal silica (product code NALCO 2327 from Nalco Chemical Co., Naperville, Ill.) in a 2000 mL poly bottle. These components were mixed by transferring the batch back and forth between the two bottles, ending with the batch in the 2000 mL poly bottle. To this bottle was added, 5.84 g of a first photoinitiator (product code IRGACURE™ 184 from Ciba Specialty Chemicals Corp., Tarrytown, N.Y.) and 1.12 g of a second photoinitiator (product code IRGACURE™ 819, also from Ciba Specialty Chemicals Corp.). The solution was shaken for 30 minutes to dissolve the photoinitiators. The resulting batch was a translucent, low-viscosity dispersion. The batch was then diluted to about 17.7% solids by weight with a 50/50 blend ethyl acetate and propylene glycol methyl ether (available from Dow Chemical as DOWANOL PM), to yield a coating formulation.

The coating formulation was coated onto a 50 micron thick PET film (MELINEX 617, available from DuPont) using a slot die at a line speed of 3.1 meters/minute. The wet coating thickness was approximately 8.1 microns. In an inert chamber (<50 ppm $O_2$), the wet coating was partially cured in-line at the same line speed with UV radiation at 395 nm and dose of 850 mJ/cm$^2$. The UV radiation was provided by UV-LEDs available from Cree, Inc. The partially cured coating sample was then dried at 70° C. in a 9 meter oven, and under a nitrogen-purged atmosphere, finally cured with a 236 Watt/cm$^2$ Fusion H bulb (available from Fusion UV Systems, Inc.). The resulting nanovoided polymeric layer had a thickness of 1.3 microns. The transmission was 96.4%, the haze was 1.33%, and the clarity was 99.7%, as measured using a BYK gardner Haze Gard Plus (Columbia, Md.) instrument. The refractive index of the nanovoided layer was between 1.20 and 1.22 as measured at 589 nm using a Metricon Prism Coupler (Metricon Corporation, Pennington, N.J.).

Figure 20:
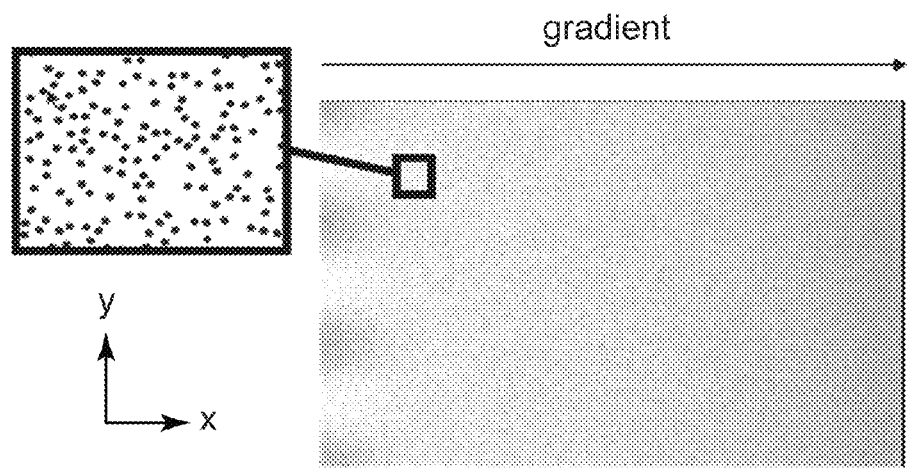
FIG. 20 is a photograph (with a magnified schematic inset) of a random gradient dot pattern similar to one used to form a patterned low index subsurface layer for a lighting device.

The nanovoided polymeric layer, still disposed on the 50 micron PET carrier film, was printed with a UV curable clear ink (UV OP1005 GP Varnish from Nazdar, Shawnee, Kans.) using an indirect gravure printing process. A flexographic tool was fabricated to have a random 100 micron gradient dot pattern, the density of the dots varying in an in-plane x direction and being relatively constant in an orthogonal in-plane y-direction. The gradient pattern was similar to that shown in the photograph of FIG. 20. A gravure roll (pyramidal and 9 cubic microns per square micron) was rated to give a wet coating of approximately 9.65 microns. The printing was done at 10 meters per minute with high intensity UV curing under a nitrogen-purged atmosphere with a 236 Watt/cm$^2$ Fusion H bulb (available from Fusion UV Systems, Inc.) after the printing. The resulting printed layer was made up of: first regions having the nanovoided polymeric material, the first regions having a first refractive index; and second regions having the same nanovoided polymeric material but wherein the nanovoids were filled or partially filed with the cured clear ink, the second regions having a second refractive index greater than that of the first regions. The optical film consisting of this dot-printed nanovoided layer atop the 50 micron PET carrier film was substantially transparent, and objects could be seen with little distortion when looking through the film. Optical properties of this optical film, before being incorporated into the light guide, were measured using the BYK Gardner Haze Gard Plus instrument. Measurements made on one side or end of the film, at which the random gradient dot pattern had a low density, were: 96.6% transmission; 3.56% haze; and 95.6% clarity. Measurements made on the opposite side or end of the film, at which the random gradient dot pattern had a high density, were: 95.8% transmission; 6.82% haze; and 89.9% clarity. Note that the transmission measurements reported here are not corrected for Fresnel reflections at the outer surfaces of the film. The refractive index of the cured ink was measured to be approximately 1.525 as measured on a flat cured sample using a Metricon prism coupler (wavelength of light used to measure the refractive index was 589 nm).

A lighting device was then made using this dot-printed optical film together with a rectangular acrylic plate, a rectangular piece or portion of the microreplicated optical film (having the spiral multi-pitch diffractive surface features) described above in Example 1, and a linear array of discrete light sources. The dot-printed nanovoided layer of the dot-printed optical film was used as a patterned low index subsurface layer to spatially control the interaction of guided-mode light with curved diffractive surface features. A rectangular section or piece was cut out of a microreplicated optical film as described in Example 1, the center of the rectangular piece substantially coinciding with the center of the spiral groove pattern. The rectangular piece had a major in-plane dimension (length) of about 6 inches (about 150 mm) and a minor in-plane dimension (width) of about 4 inches (about 100 mm). A rectangular acrylic (PMMA) plate was obtained having a major in-plane dimension (length) of about 6 inches (about 150 mm), a minor in-plane dimension (width) of about 4 inches (about 100 mm), and a thickness of 3 mm. A piece of the dot-printed optical film described above was attached to one of the major surfaces of the acrylic plate using a pressure sensitive adhesive, 3M Optically clear adhesive 8171. The rectangular piece of the microreplicated optical film was attached to the opposite side of the dot-printed optical film using an additional layer of 3M Optically Clear Adhesive 8171, such that the microreplicated surface (diffractive surface features) faced away from the acrylic plate and was exposed to air, and such that the dot-printed nanovoided layer was buried or sandwiched between the microreplicated film and the acrylic plate with substantially no air gaps between the film pieces and the plate, the dot-printed nanovoided layer thus forming a patterned low index subsurface layer. The combination of the films and the plate resulted in a light guide with diffractive surface features on (only) one major surface thereof, the light guide having in-plane dimensions of about 6 inches and 4 inches (about 150 mm and 100 mm) and a thickness of about 3 mm.

Figure 21A:
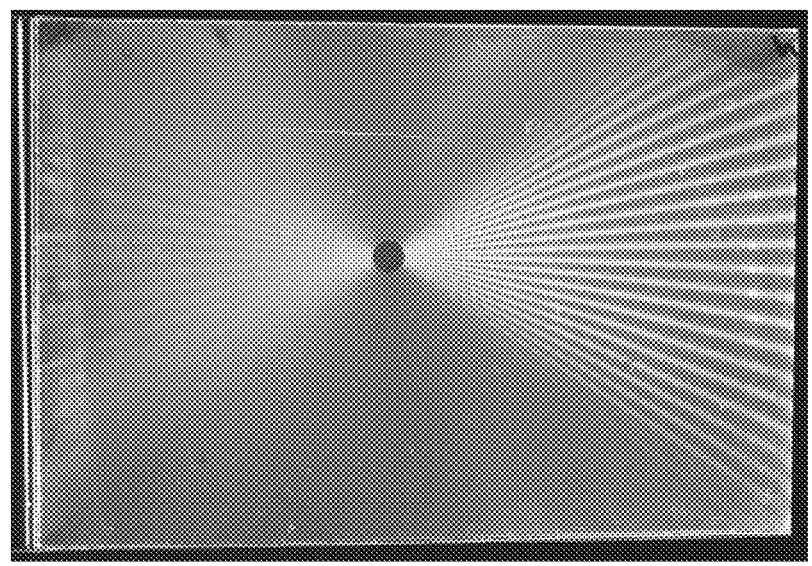
FIG. 21a is a photograph of a lighting device having a rectangular light guide, curved diffractive surface features, and a patterned low index subsurface layer (similar to that shown in FIG. 20), the device also capable of incorporating patterned printing in contact with the diffractive surface features.
Figure 21B:
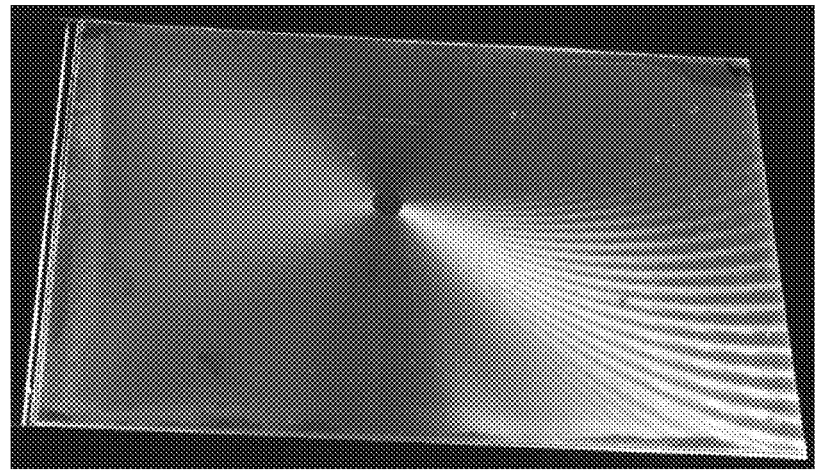
FIG. 21*b* is a photograph of the lighting device of FIG. 21*a* at an oblique viewing angle.

The light guide so constructed was then placed into an illumination test fixture which contained a light source module having eighteen equally spaced discrete light sources, the light sources being nominally identical LEDs (product code NCSL119T-H1 from Nichia), each LED emitting white light ("warm white") in a divergent distribution. The light source module was mounted along the short side of the light guide. The light sources were energized with a power supply and photographs were taken of the lighting device from various viewing geometries. A strip of black electrical tape was placed on one side of the LED array to block stray light, emitted in sideways directions from the LEDs, from reaching the camera. A photograph of the lighting device when viewed from a position substantially perpendicular to the face of the light guide is shown in FIG. 21a. In this view, the light sources are on the right side of this figure. A photograph of the same lighting device when viewed at an oblique angle to the plane of the light guide is shown in FIG. 21b. As a result of the gradient patterned low index subsurface layer, the lighting device exhibited a uniform-appearing luminance distribution when looking at the light guide, and also provided, on a diffusive surface located 1 meter from the light guide approximately along the optical axis, illumination that was substantially uniform in color. Bright bands associated with the discrete light sources can be clearly seen in each of the viewing geometries, and the bands were observed to change in shape and curvature with viewing geometry. Variable color hues could also be seen at different areas of the light guide, but the colors are not visible in the grayscale photograph of the figures.

Although the lighting device of this Example 3 did not include patterned printing of a light transmissive material on the diffractive surface features of the light guide, such patterned printing, whether in the form of the U.S. map of Examples 1 and 2 or in the form of other indicia as desired, may be readily included in the construction to achieve results in conformity with those of Examples 1 and 2.

The teachings of this application can be used in combination with the teachings of any or all of the following commonly assigned applications, which are incorporated herein by reference and filed on even date herewith: U.S. patent application Ser. No. 13/572,805, "Diffractive Lighting Devices With 3-Dimensional Appearance"; U.S. patent application Ser. No. 13/572,823, "Colorful Diffractive Luminaires Providing White Light Illumination"; and U.S. patent application Ser. No. 13/572,835, "Diffractive Luminaires".

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A lighting device, comprising:
   a light guide having a first major surface, the first major surface having first and second diffractive surface features formed in first and second portions thereof respectively, at least one of the first and second diffractive surface features adapted to couple guided-mode light out of the light guide; and
   a patterned light transmissive layer in optical contact with the second diffractive surface features but not the first diffractive surface features, the patterned layer comprising a second light transmissive medium;
   a first light transmissive medium in optical contact with the first diffractive surface features but not the second diffractive surface features;
   wherein the first and second light transmissive media have different first and second refractive indices respectively at a visible wavelength.

2. The device of claim 1, wherein the first and second refractive indices differ by at least 0.05.

3. The device of claim 1, wherein the first and second portions of the first major surface define indicia.

4. The device of claim 3, wherein the first and second refractive indices are sufficiently different so that differences in out-coupled light between the first and second portions cause the indicia to be readily apparent to a user of the lighting device when guided-mode light propagates within the light guide.

5. The device of claim 3, wherein the light guide exhibits low distortion for viewing objects through the light guide in both the first and second portions.

6. The device of claim 5, wherein the indicia is not readily apparent to a user of the lighting device when guided-mode light does not propagate within the light guide.

7. The device of claim 1, further comprising:
   one or more light sources disposed proximate the light guide to provide the guided-mode light in the light guide.

8. The device of claim 1, wherein the first light transmissive medium is air.

9. The device of claim 1, wherein the second light transmissive medium is an adhesive.

10. The device of claim 1, wherein the first and second light transmissive media are both polymer compositions.

11. The device of claim 1, wherein the first and second light transmissive media are both substantially transparent and colorless.

12. The device of claim 1, wherein the first and second diffractive surface features have a diffractive surface feature refractive index, the diffractive surface feature refractive index differing from the first refractive index by a first difference dn1 and differing from the second refractive index by a second difference dn2, a magnitude of dn2 being substantially less than that of dn1 such that the second diffractive surface features couple little or no guided-mode light out of light guide relative to the first diffractive surface features.

13. The device of claim 12, wherein the magnitude of dn2 is less than half that of dn1 at a visible wavelength of light.

14. The device of claim 1, wherein the first and second diffractive surface features have a diffractive surface feature refractive index, the diffractive surface feature refractive index differing from the first refractive index by a first difference dn1 and differing from the second refractive index by a second difference dn2, wherein dn1 and dn2 have magnitudes comparable to each other such that substantial guided-mode light is coupled out of the light guide by both the first and second diffractive surface features.

15. The device of claim 1, further comprising a patterned low index subsurface layer configured to selectively block some guided mode light from reaching at least some of the first and/or second diffractive surface features.

16. The device of claim 15, wherein the patterned low index subsurface layer comprises first and second layer portions, the first layer portion comprising nanovoided polymeric material, and the second layer portion comprising the nanovoided polymeric material and an additional material.

17. An optical film adapted for attachment to a substrate to form a light guide, the optical film comprising:
a first major surface having first and second diffractive surface features formed in first and second portions respectively of the first major surface, at least one of the first and second diffractive surface features adapted to couple guided-mode light out of the light guide; and
a patterned light transmissive layer in optical contact with the second diffractive surface features but not the first diffractive surface features, the patterned layer comprising a second light transmissive medium;
a first light transmissive medium in optical contact with the first diffractive surface features but not the second diffractive surface features;
wherein the first and second light transmissive media have different first and second refractive indices respectively at a visible wavelength.

18. The film of claim 17, wherein the optical film exhibits low distortion for viewing objects through the optical film in both the first and second portions.

19. The film of claim 17, wherein the first and second portions of the first major surface define indicia.

20. The film of claim 19, wherein the indicia is not readily apparent to a user of the film before the film is attached to the substrate.

21. The film of claim 17, wherein the film further comprises:
a second major surface opposite the first major surface; and
a light transmissive adhesive layer disposed at the second major surface to facilitate attachment of the film to a substrate.

22. The film of claim 17, further comprising:
a flexible carrier film; and
a prism layer cast on the carrier film;
wherein the first major surface of the optical film is an outer surface of the prism layer.

23. A security article, comprising:
a light guide having a first major surface, the first major surface having first and second diffractive surface features formed in first and second portions thereof respectively, at least one of the first and second diffractive surface features adapted to couple guided-mode light out of the light guide; and
a patterned light transmissive layer in optical contact with the second diffractive surface features but not the first diffractive surface features, the patterned layer comprising a second light transmissive medium;
a first light transmissive medium in optical contact with the first diffractive surface features but not the second diffractive surface features;
wherein the first and second light transmissive media have different first and second refractive indices respectively at a visible wavelength.

24. The article of claim 23, wherein the light guide exhibits low distortion for viewing objects through the light guide in both the first and second portions.

25. The article of claim 23, further comprising a patterned low index subsurface layer configured to selectively block some guided mode light from reaching at least some of the first and/or second diffractive surface features.

26. The article of claim 23, wherein the patterned low index subsurface layer comprises first and second layer portions, the first layer portion comprising nanovoided polymeric material, and the second layer portion comprising the nanovoided polymeric material and an additional material.

* * * * *